(12) United States Patent  
Damnjanovic

(10) Patent No.: US 8,538,337 B2
(45) Date of Patent: Sep. 17, 2013

(54) METHODS AND APPARATUS FOR UPLINK AND DOWNLINK INTER-CELL INTERFERENCE COORDINATION

(75) Inventor: Aleksandar Damnjanovic, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/553,700

(22) Filed: Jul. 19, 2012

(65) Prior Publication Data

US 2012/0281588 A1    Nov. 8, 2012

Related U.S. Application Data

(63) Continuation of application No. 12/423,498, filed on Apr. 14, 2009, now Pat. No. 8,260,206.

(60) Provisional application No. 61/045,549, filed on Apr. 16, 2008.

(51) Int. Cl.
 *H04B 1/00* (2006.01)
(52) U.S. Cl.
 USPC .......................................... 455/63.1; 455/444
(58) Field of Classification Search
 USPC ................ 455/63.1, 444, 501, 522, 13.4, 447
 See application file for complete search history.

(56) References Cited

U.S. PATENT DOCUMENTS

| 7,184,708 | B1 | 2/2007 | Kwa et al. |
| 7,477,920 | B2 | 1/2009 | Scheinert et al. |
| 7,751,843 | B2 | 7/2010 | Butala |
| 8,032,142 | B2 | 10/2011 | Carter et al. |
| 8,260,206 | B2 | 9/2012 | Damnjanovic |
| 8,265,642 | B2 * | 9/2012 | Zhang et al. .................. 455/450 |
| 2003/0099258 | A1 | 5/2003 | Calcev et al. |
| 2007/0042799 | A1 | 2/2007 | Jubin et al. |
| 2007/0116034 | A1 | 5/2007 | Bridge et al. |
| 2007/0141992 | A1 | 6/2007 | Kwa et al. |
| 2007/0293224 | A1 | 12/2007 | Wang et al. |
| 2008/0069028 | A1 | 3/2008 | Richardson |

(Continued)

FOREIGN PATENT DOCUMENTS

| CN | 1894979 A | 1/2007 |
| JP | 2007129405 A | 5/2007 |

(Continued)

OTHER PUBLICATIONS

Ericsson: "Alignment of X2 Release Resource name to SI naming" 3GPP DRAFT; R3-080642, SRD Generation Partnership Project (3GPP), Mobile Competence Centre ; 650, Route Des Lucioles ; F-06921 Sophia-Antipolis Cedex ; France, vol. RAN WG3, No. Shenzhen, China; 20080326, Mar. 26, 2008, XP050163864 the whole document.

(Continued)

*Primary Examiner* — Henry Choe
(74) *Attorney, Agent, or Firm* — Kam T. Tam

(57) ABSTRACT

A method for inter-cell interference coordination (ICIC) by a home evolved NodeB (HeNB) is described. A portion of bandwidth is reserved for a user equipment (UE). Notification of the reserved portion of bandwidth is sent to at least one potentially interfering evolved NodeB (eNB). A data exchange is performed with the UE using the reserved portion of bandwidth. Notification is sent to the potentially interfering eNBs releasing the reserved portion of bandwidth.

29 Claims, 19 Drawing Sheets

(56) References Cited

U.S. PATENT DOCUMENTS

| | | | |
|---|---|---|---|
| 2010/0311449 A1* | 12/2010 | Whinnett | 455/501 |
| 2010/0316096 A1* | 12/2010 | Adjakple et al. | 375/211 |
| 2012/0135713 A1* | 5/2012 | Lee et al. | 455/411 |
| 2012/0257598 A1* | 10/2012 | Karampatsis et al. | 370/331 |

FOREIGN PATENT DOCUMENTS

| | | |
|---|---|---|
| JP | 2009521831 A | 6/2009 |
| JP | 2009522958 | 6/2009 |
| WO | 2005015917 A2 | 2/2005 |
| WO | 2007073271 A1 | 6/2007 |
| WO | WO2007097672 | 8/2007 |
| WO | WO2007112143 | 10/2007 |

OTHER PUBLICATIONS

International Search Report and Written Opinion—PCT/US2009/040863, International Search Authority—European Patent Office—Jan. 29, 2010.

NEC: "Resource Status Update Procedure" 3GPP Draft; R3-080898, SRD Generation Partnership Project (3GPP), Mobile Competence Centre ; 650, Route Des Lucioles ; F-06921 Sophia-Antipolis Cedex ; France, vol. RAN WG3, No. Shenzhen, China; 20080327, Mar. 27, 2008, XP050164090 the whole document.

Orange: "Need for an X2 interface for Home eNB" 3GPP Draft; R3-071816, SRD Generation Partnership Project (3GPP), Mobile Competence Centre; 650, Route Des Lucioles; F-06921 Sophia-Antipolis Cedex; France, vol. RAN WG3, No. Sophia Antipolis, France; 20071003, Oct. 3, 2007, XP050162617 the whole document.

Panasonic: "CSG cell handover" 3GPP Draft; R2-080884_CSG Cell Handover, 3rd Generation Partnership Project (3GPP), Mobile Competence Centre ; 650, Route Des Lucioles ; F-06921 Sophia-Antipolis Cedex ; France, vol. RAN W62, No. Sorrento, Italy; 20080211, Feb. 5, 2008, XP050138693 the whole document.

Vodafone Group: "Discussion of Access Control for Home-eNodeB" 3GPP Draft; R2-072070, SRD Generation Partnership Project (3GPP), Mobile Competence Centre ; 650, Route Des Lucioles ; F-06921 Sophia-Antipolis Cedex ; France, vol. RAN WG2, No. Kobe, Japan; 20070504, May 4, 2007, XP050134940 [retrieved on May 4, 2007] the whole document.

* cited by examiner

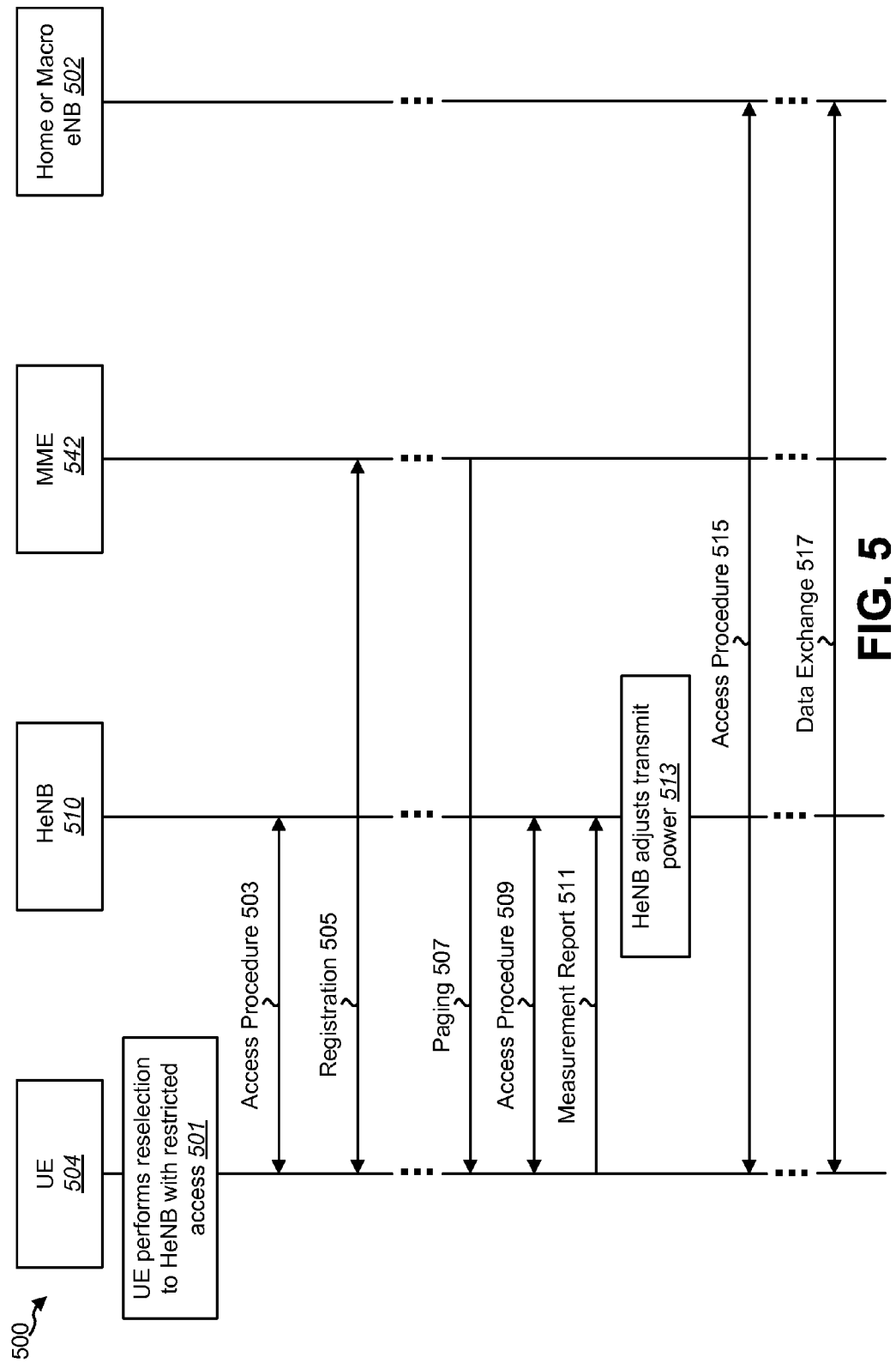

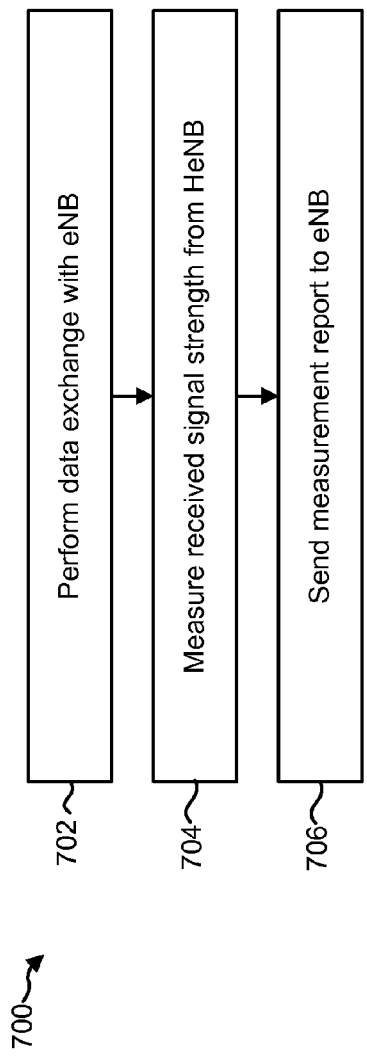
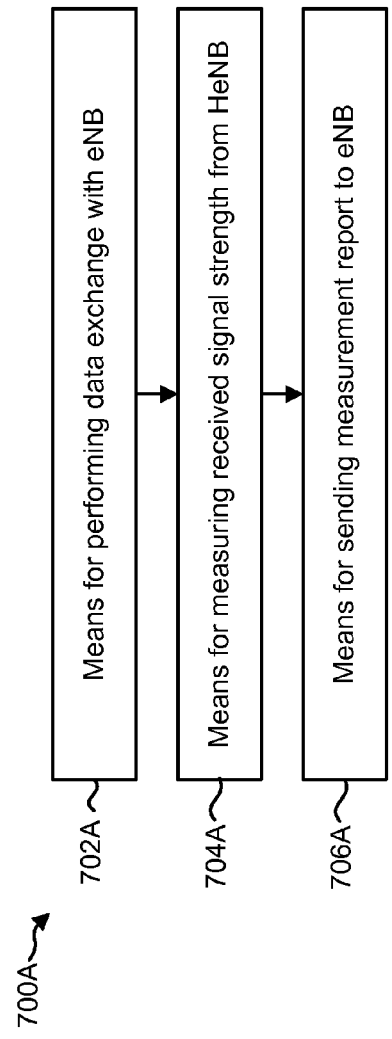
FIG. 7
FIG. 7A

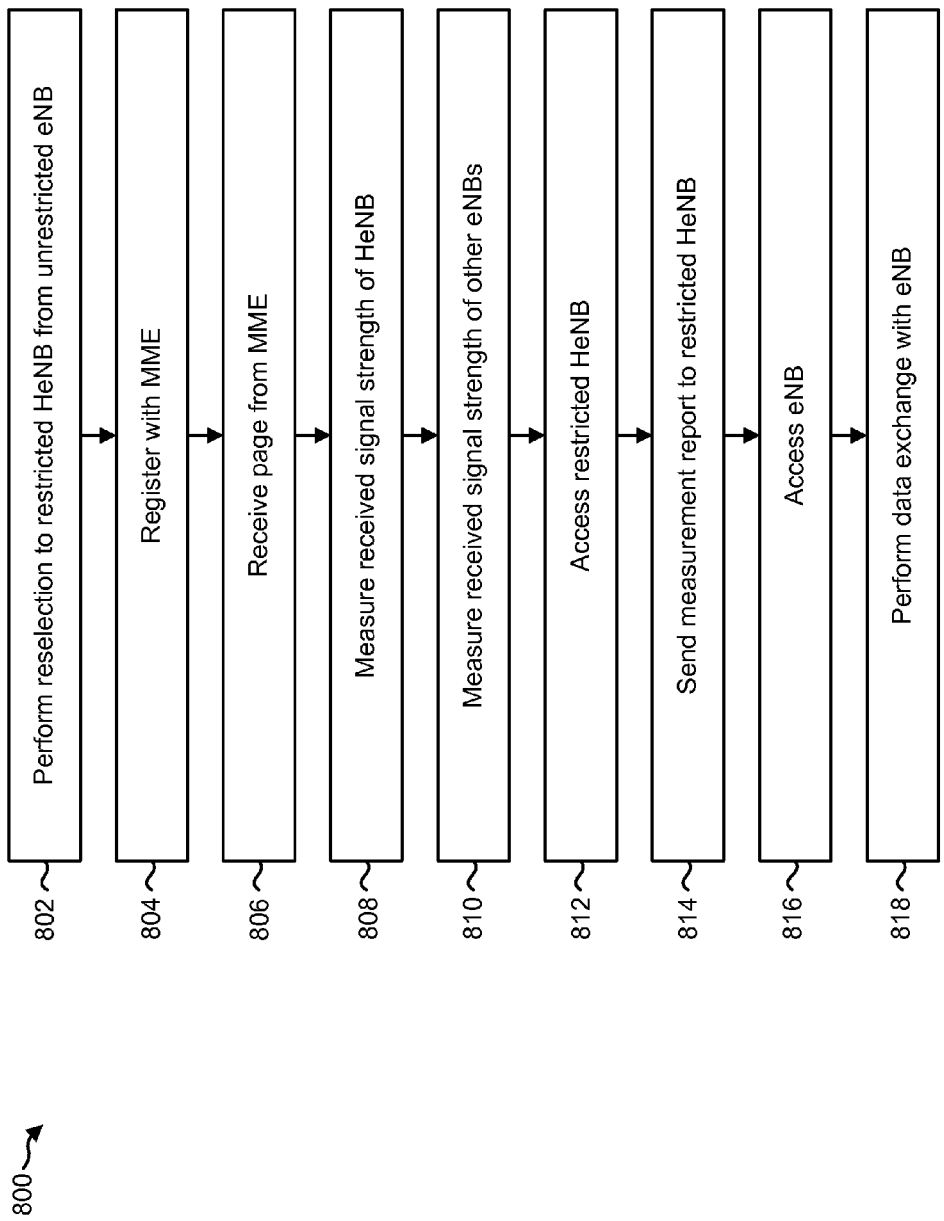

METHODS AND APPARATUS FOR UPLINK AND DOWNLINK INTER-CELL INTERFERENCE COORDINATION

CLAIM OF PRIORITY UNDER 35 U.S.C. §119

This application for patent claims the benefit of U.S. Provisional Application Ser. No. 61/045,549, filed on Apr. 16, 2008, and entitled "INTERFERENCE MANAGEMENT FOR FEMTO CELLS." The present Application is also a continuation application of, and claims priority to U.S. application Ser. No. 12/423,498, filed Apr. 14, 2009, "METHODS AND APPARATUS FOR UPLINK AND DOWNLINK INTER-CELL INTERFERENCE COORDINATION," all assigned to the assignee hereof, the disclosures of which are hereby expressly incorporated herein by reference.

TECHNICAL FIELD

The present disclosure relates generally to wireless communication systems. More specifically, the present disclosure relates to methods and apparatus for uplink and downlink inter-cell interference coordination.

BACKGROUND

Wireless communication systems have become an important means by which many people worldwide have come to communicate. A wireless communication system may provide communication for a number of mobile stations, each of which may be serviced by a base station.

As the number of mobile stations deployed increases, the need for proper bandwidth utilization becomes more important. Furthermore, the introduction of semi-autonomous base stations may create interference with existing base stations. Inter-cell interference coordination (ICIC) may provide for the reduction or elimination of interference due to the introduction of semi-autonomous base stations.

BRIEF DESCRIPTION OF THE DRAWINGS

FIG. 5 illustrates transmission schemes between a UE, a mobility management entity (MME) and two or more eNBs for downlink ICIC;

FIG. 7 is a flow diagram illustrating a method for downlink ICIC by a UE;

FIG. 7A illustrates means-plus-function blocks corresponding to the method of FIG. 7;

FIG. 8 is a flow diagram illustrating another method for downlink ICIC by a UE;

DETAILED DESCRIPTION

Figure 1:
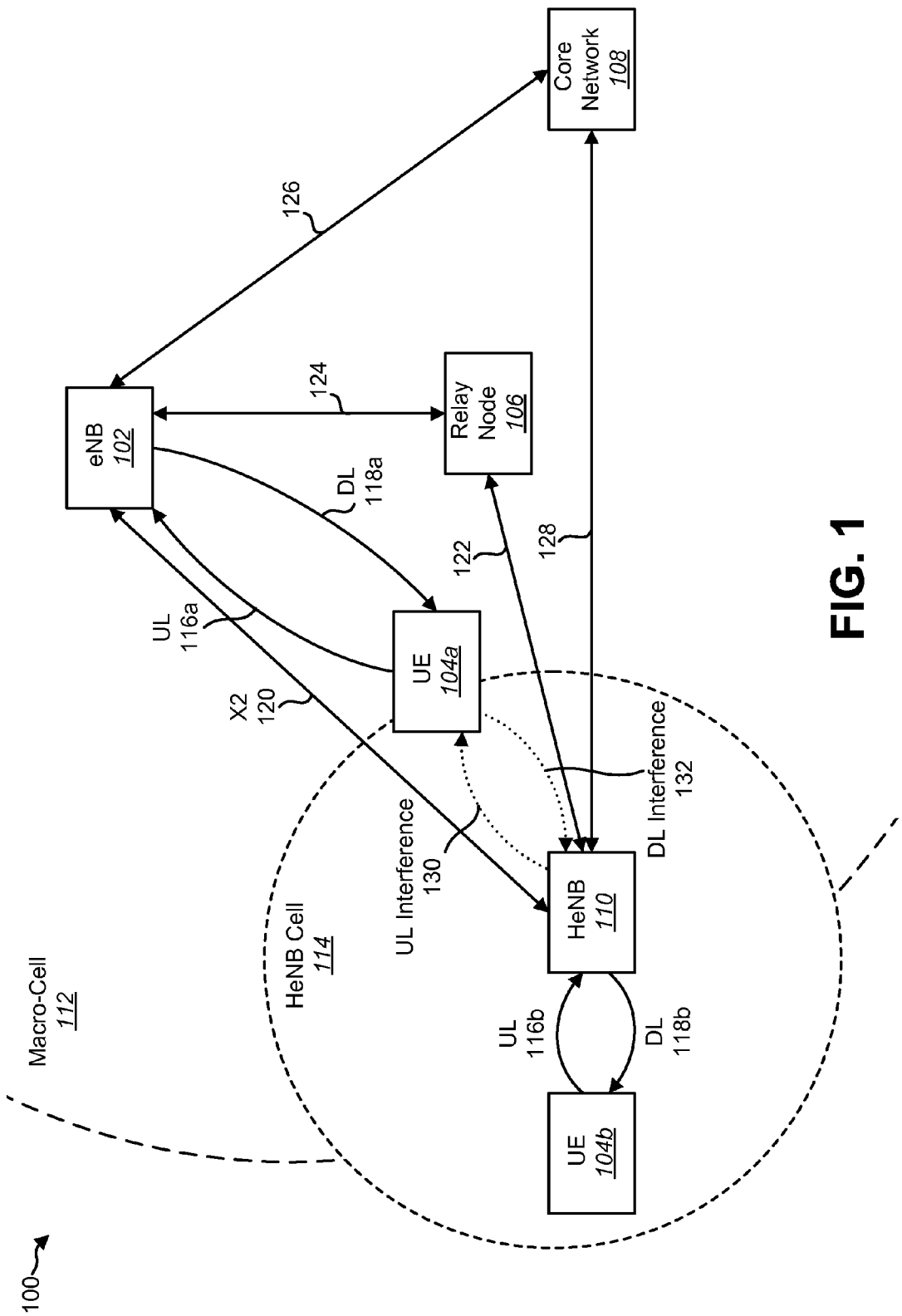
FIG. 1 shows a wireless communication system with multiple user equipments (UEs), a home evolved nodeB (HeNB), an evolved nodeB (eNB), a relay node, and a core network.

A method for inter-cell interference coordination (ICIC) by a home evolved NodeB (HeNB) is disclosed. A portion of bandwidth is reserved for a user equipment (UE). Notification of the reserved portion of bandwidth is sent to at least one potentially interfering evolved NodeB (eNB). A data exchange is performed with the UE using the reserved portion of bandwidth. Notification is sent to the at least one potentially interfering eNB releasing the reserved portion of bandwidth.

The notification releasing the reserved portion of bandwidth may be sent when the data exchange with the UE has stopped or when the UE enters idle mode.

The at least one potentially interfering eNB may be identified through a self organizing network (SON) server. The HeNB may communicate with the at least one potentially interfering eNB through a backhaul connection and/or an X2 link. The at least one potentially interfering eNB may be another HeNB.

A method for downlink inter-cell interference coordination (ICIC) by a home evolved NodeB (HeNB) is also disclosed. A data exchange is performed with a user equipment (UE). A measurement report is received. A transmit power is reduced with a first slew rate. The transmit power is increased with a second slew rate.

A timer may be started. It may be determined whether the timer has elapsed, and the transmit power may be increased with the second slew rate when the timer has elapsed.

The HeNB may be a restricted HeNB. The UE may not belong to a closed subscriber group (CSG) for the HeNB.

The measurement report may be received from the UE. In another configuration, the measurement report may be received from an evolved NodeB (eNB). The eNB may be a potentially interfering eNB or a potentially interfering HeNB.

A method for downlink inter-cell interference coordination (ICIC) by a user equipment (UE) is disclosed. A received signal strength is measured for a home evolved NodeB (HeNB). A measurement report is prepared. The measurement report includes the received signal strength for the HeNB. The measurement report is sent to a first evolved NodeB (eNB).

The first eNB may be the HeNB. A reselection to the HeNB may be performed. Access procedures may be performed with the HeNB for a first time. A mobility management entity (MME) may be registered with. A page may be received from the MME. Access procedures may be performed with the HeNB for a second time. The UE may perform access procedures with the HeNB for the second time before sending the measurement report to the HeNB. Performing a reselection to the HeNB may occur because downlink signals from the HeNB are interfering with downlink signals from a second eNB.

A home evolved NodeB (HeNB) configured for inter-cell interference coordination (ICIC) is also disclosed. The HeNB includes a processor and memory in electronic communication with the processor. Executable instructions are stored in the memory. A portion of bandwidth is reserved for a user equipment (UE). Notification of the reserved portion of bandwidth is sent to at least one potentially interfering evolved NodeB (eNB). A data exchange is performed with the UE using the reserved portion of bandwidth. Notification is sent to the potentially interfering eNBs releasing the reserved portion of bandwidth.

A home evolved NodeB (HeNB) configured for downlink inter-cell interference coordination (ICIC) is further disclosed. The HeNB includes a processor and memory in electronic communication with the processor. Executable instructions are stored in the memory. A data exchange is performed with a user equipment (UE). A measurement report is received. A transmit power is reduced with a first slew rate. The transmit power is increased with a second slew rate.

A user equipment (UE) configured for downlink inter-cell interference coordination (ICIC) is also disclosed. The UE includes a processor and memory in electronic communication with the processor. Executable instructions are stored in the memory. A received signal strength is measured for a home evolved NodeB (HeNB). A measurement report is prepared. The measurement report includes the received signal strength for the HeNB. The measurement report is sent to a first evolved NodeB (eNB).

An apparatus for inter-cell interference coordination (ICIC) is also disclosed. The apparatus includes means for reserving a portion of bandwidth for a user equipment (UE). The apparatus includes means for sending notification of the reserved portion of bandwidth to at least one potentially interfering evolved NodeB (eNB). The apparatus also includes means for performing a data exchange with the UE using the reserved portion of bandwidth. The apparatus further includes means for sending notification to the at least one potentially interfering eNB releasing the reserved portion of bandwidth.

An apparatus for downlink inter-cell interference coordination (ICIC) is disclosed. The apparatus includes means for performing a data exchange with a user equipment (UE). The apparatus includes means for receiving a measurement report. The apparatus also includes means for reducing a transmit power with a first slew rate and means for increasing the transmit power with a second slew rate.

Another apparatus for downlink inter-cell interference coordination (ICIC) is disclosed. The apparatus includes means for measuring a received signal strength for a home evolved NodeB (HeNB). The apparatus includes means for preparing a measurement report. The measurement report includes the received signal strength for the HeNB. The apparatus also includes means for sending the measurement report to a first evolved NodeB (eNB).

A computer-program product for a wireless device configured for inter-cell interference coordination (ICIC) is disclosed. The computer-program product includes a computer-readable medium having instructions thereon. The instructions include code for reserving a portion of bandwidth for a user equipment (UE). The instructions include code for sending notification of the reserved portion of bandwidth to at least one potentially interfering evolved NodeB (eNB). The instructions include code for performing a data exchange with the UE using the reserved portion of bandwidth. The instructions include code for sending notification to the at least one potentially interfering eNB releasing the reserved portion of bandwidth.

Another computer-program product for a wireless device configured for downlink inter-cell interference coordination (ICIC) is disclosed. The computer-program product includes a computer-readable medium having instructions thereon. The instructions include code for performing a data exchange with a user equipment (UE). The instructions include code for receiving a measurement report. The instructions also include code for reducing a transmit power with a first slew rate and code for increasing the transmit power with a second slew rate.

Additionally, another computer-program product for a wireless device configured for downlink inter-cell interference coordination (ICIC) is disclosed. The computer-program product includes a computer-readable medium having instructions thereon. The instructions include code for measuring a received signal strength for a home evolved NodeB (HeNB). The instructions include code for preparing a measurement report. The measurement report includes the received signal strength for the HeNB. The instructions include code for sending the measurement report to a first evolved NodeB (eNB).

The $3^{rd}$ Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices.

In 3GPP LTE, a mobile station or device may be referred to as a "user equipment" (UE). A base station may be referred to as an evolved NodeB (eNB). A semi-autonomous base station may be referred to as a home eNB (HeNB). An HeNB may thus be one example of an eNB. The HeNB and/or the coverage area of an HeNB may be referred to as a femtocell, an HeNB cell or a closed subscriber group (CSG) cell.

FIG. 1 shows a wireless communication system 100 with multiple user equipments (UEs) 104, a home evolved NodeB (HeNB) 110, an evolved NodeB (eNB) 102, a relay node 106, and a core network 108. The eNB 102 may be the central base station in a wireless communication system. A UE 104 may also be called, and may contain some or all of the functionality of, a terminal, a mobile station, an access terminal, a subscriber unit, a station, etc. A UE 104 may be a cellular phone, a personal digital assistant (PDA), a wireless device, a wireless modem, a handheld device, a laptop computer, etc.

The core network 108 may be the central piece of a telecommunications network. For example, the core network 108 may facilitate communications with the Internet, other UEs, etc. A UE 104 may communicate with the core network 108 through an eNB 102 or an HeNB 110. Multiple UEs 104 may be in wireless communication with an eNB 102 or an HeNB 110.

The term "eNB" may be used to refer to the eNB 102 or to the HeNB 110, because the HeNB 110 may be considered to be one type of eNB. The eNB 102 may be referred to as a macro-eNB 102.

A macro-eNB 102 may have a much larger range than an HeNB 110. Furthermore, a macro-eNB 102 may provide unrestricted access to UEs 104a subscribing to the core network 108. In contrast, an HeNB 110 may provide restricted access to UEs 104b belonging to a closed subscriber group (CSG). It may be assumed that a UE 104 may only communicate with a single eNB at a given time. Thus, a UE 104b communicating with an HeNB 110 may not simultaneously communicate with a macro-eNB 102.

The coverage area of an eNB may be referred to as a cell. Depending on sectoring, one or more cells may be served by the eNB. The coverage area of a macro-eNB 102 may be referred to as a macro-cell 112 or an eNB cell. Likewise, the coverage area of an HeNB 110 may be referred to as an HeNB-cell 114 or a femtocell.

Multiple eNBs may have a backhaul connection with each other through the core network 108. For example, a backhaul connection may exist between the HeNB 110 and the eNB 102. In a backhaul connection, an eNB 102 may communicate 126 with the core network 108 and the core network 108 may correspondingly communicate 128 with the HeNB 110. A direct connection may also exist between multiple eNBs. For example, a direct connection may exist between the HeNB 110 and the eNB 102. The direct connection may be an X2 connection 120. Details about an X2 interface may be found in 3GPP TS 36.423x2-AP. Multiple eNBs may also have a connection 122, 124 through use of a relay node 106. In one configuration, the relay node 106 may be the core network 108.

The coverage range for a macro-cell 112 may be much larger than the coverage range for an HeNB-cell 114. In one configuration, the coverage range for a macro-cell 112 may include the entire coverage range for an HeNB-cell 114.

A UE 104 may communicate with a base station (e.g., the eNB 102 or the HeNB 110) via transmissions on the uplink 116 and the downlink 118. The uplink 116 (or reverse link) refers to the communication link from the UE 104 to a base station, and the downlink 118 (or forward link) refers to the communication link from the base station to the UE 104. Thus, a UE 104a may communicate with the eNB 102 via the uplink 116a and downlink 118a. Likewise, a UE 104b may communicate with the HeNB 110 via the uplink 116b and downlink 118b.

The resources of the wireless communication system 100 (e.g., bandwidth and transmit power) may be shared among multiple UEs 104. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

A UE 104a in wireless communication with a macro-cell 112 may be referred to as a macro-UE 104a. A UE 104b in wireless communication with an HeNB-cell 114 may be referred to as an HeNB-UE 104b. One or more macro-UEs 104a located within an HeNB-cell 114 may jam the HeNB-cell 114. For example, a macro-UE 104a located within an HeNB-cell 114 may cause interference for communications between an HeNB-UE 104b and the HeNB 110. Likewise, a macro-UE 104a within the HeNB-cell 114 may not have macro-cell 112 coverage due to interference. Both uplink interference 130 and downlink interference 132 may occur.

If there are no UEs 104 in the CSG cell (HeNB cell 114), there may be no interference issues. In order to allow a successful initial access by a UE 104 to the CSG cell, the CSG cell may dynamically bias the open loop power control algorithm to balance the effect of high interference. CSG cells may also add noise to balance the uplink 116 and the downlink 118.

Inter-cell interference coordination (ICIC) may be used to prevent the uplink interference 130 and/or the downlink interference 132. Frequency ICIC may be feasible for both synchronous and asynchronous deployments. Time ICIC may be feasible in synchronized deployments. However, asynchronous deployments may require UE 104 feedback. Antenna techniques such as nulling interference from macro-cell UEs 104a may be used to control uplink inter-cell interference 130.

Figure 2:
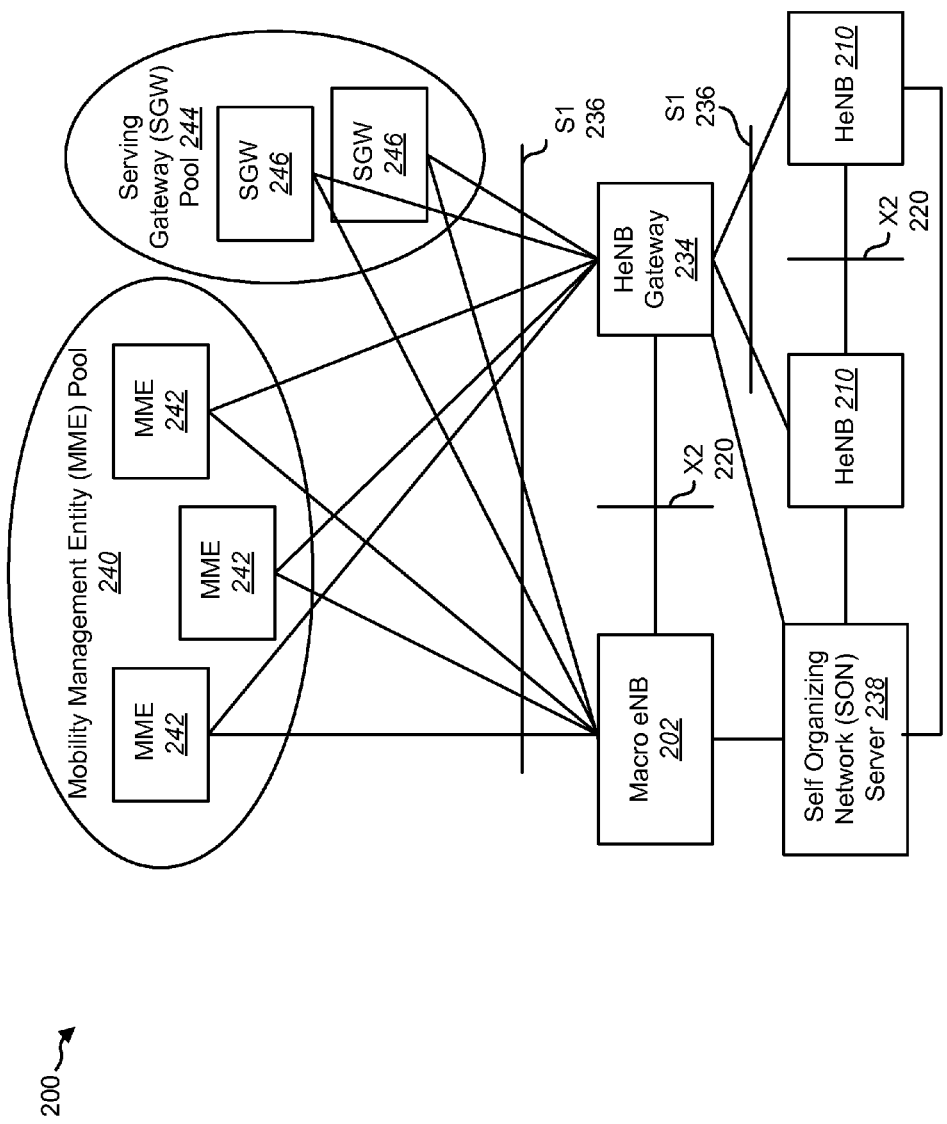
FIG. 2 is a wireless communication system with a macro-eNB and multiple HeNBs.

FIG. 2 is a wireless communication system 200 with a macro-eNB 202 and multiple HeNBs 210. The wireless communication system 200 may include an HeNB gateway 234 for scalability reasons. The macro-eNB 202 and the HeNB gateway 234 may each communicate with a pool 240 of mobility management entities (MME) 242 and a pool 244 of serving gateways (SGW) 246. The HeNB gateway 234 may appear as a C-plane and a U-plane relay for dedicated S1 connections 236. An S1 connection 236 may be a logical interface specified as the boundary between an evolved packet core (EPC) and an Evolved Universal Terrestrial Access Network (EUTRAN). The HeNB gateway 234 may act as a macro-eNB 202 from an EPC point of view. The C-plane interface may be S1-MME and the U-plane interface may be S1-U.

The HeNB gateway 234 may act towards an HeNB 210 as a single EPC node. The HeNB gateway 234 may ensure S1-flex connectivity for an HeNB 210. The HeNB gateway 234 may provide a 1:n relay functionality such that a single HeNB 210 may communicate with n MMEs 242. The HeNB gateway 234 registers towards the pool 240 of MMEs 242 when put into operation via the S1 setup procedure. The HeNB gateway 234 may support setup of S1 interfaces 236 with the HeNBs 210.

The wireless communication system 200 may also include a self organizing network (SON) server 238. The SON server 238 may provide automated optimization of a 3GPP LTE network. The SON server 238 may be a key driver for improving operation and maintenance (O&M) to the wireless communication system 200. An X2 link 220 may exist between the macro-eNB 202 and the HeNB gateway 234. X2 links 220 may also exist between each of the HeNBs 210 connected to a common HeNB gateway 234. The X2 links 220 may be set up based on input from the SON server 238. An X2 link 220 may convey ICIC information. If an X2 link 220 cannot be established, the S1 link 236 may be used to convey ICIC information.

Figure 3:
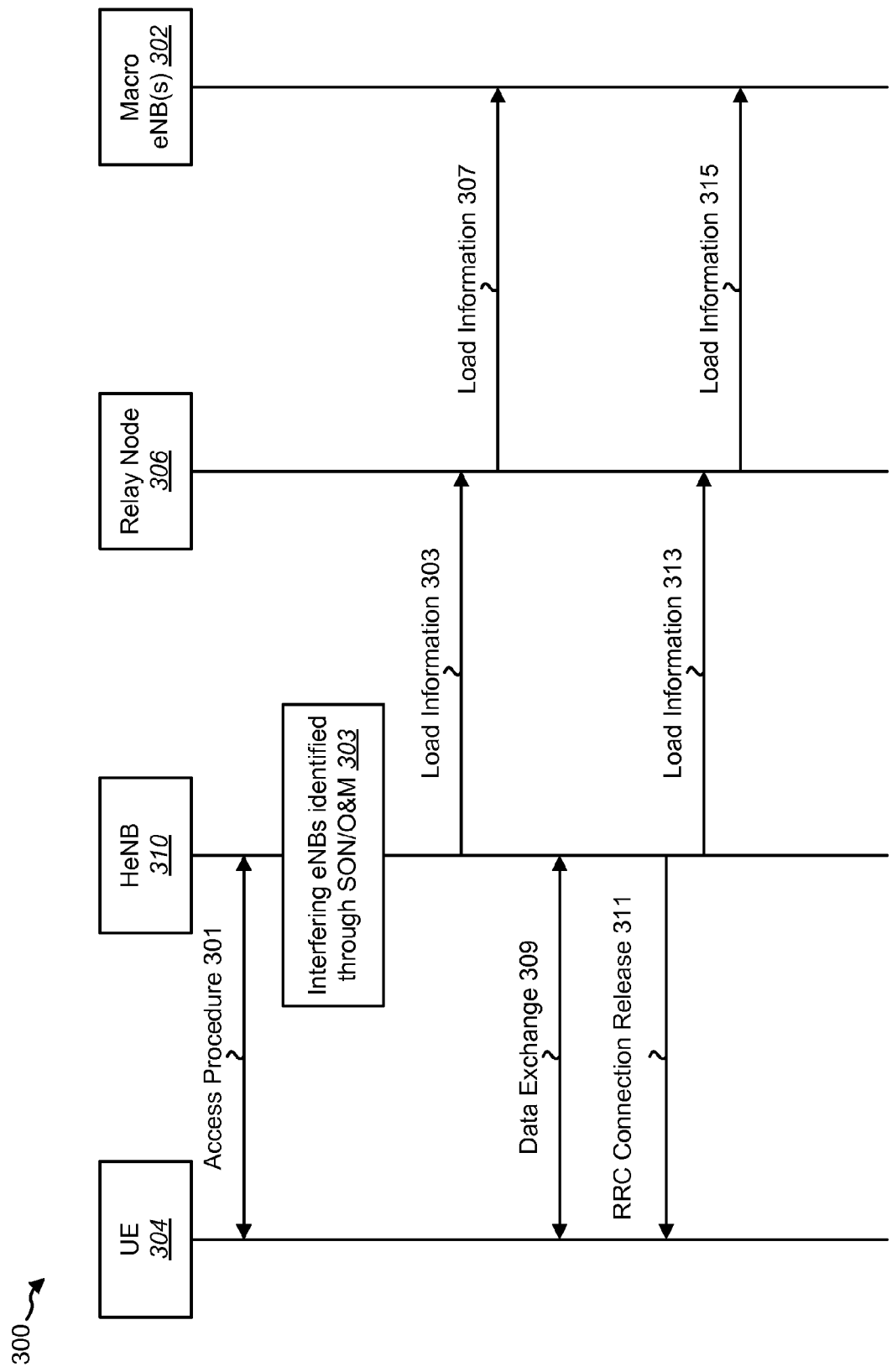
FIG. 3 illustrates transmission schemes between a UE and two or more eNBs for uplink ICIC.

FIG. 3 illustrates transmission schemes 300 between a UE 304 and two or more eNBs for uplink ICIC. One of the eNBs may be an HeNB 310. The HeNB 310 may provide unrestricted access to the core network 108 for UEs 304. The UE 304 and the HeNB 310 may perform 301 access procedures between each other. Access procedures comprise an exchange of messages between the UE 304 and an eNB or an HeNB 310. The HeNB 310 may then identify 303 one or more interfering eNBs 302 through SON and/or O&M. The one or more interfering eNBs 302 may be HeNBs and/or macro-eNBs. An interfering eNB 302 may be a nearby eNB whose communications with a UE interfere with communications between the HeNB 310 and the UE 304. The one or more interfering eNBs 302 may be stored on the HeNB 310 in a neighboring cell list. The neighboring cell list is discussed in more detail below in relation to FIG. 13.

The HeNB 310 may determine load information for the UE 304. Load information may include overload and/or protected bands for the UE 304. For example the HeNB 310 may determine particular frequency resources for the UE 304 to use in uplink communications 116b with the HeNB 310. The HeNB 310 may instruct the UE 304 to send uplink transmissions 116b over the particular frequency resources. In one configuration, the HeNB 310 may use a different frequency band than the interfering eNBs 302. For example, the HeNB 310 and interfering eNBs 302 may each use fractional frequency reuse (FFR). In FFR, the HeNB 310 and interfering eNBs 302 use the same frequency band along with the same low power sub-channels but each uses only a fraction of the high power sub-channels. Bandwidth partitioning may be accomplished through the SON server 238. The FFR may be managed dynamically. Dynamic FFR may be important for the early deployment of CSG cells. A relatively small number of CSG cells may not warrant static FFR or a separate carrier. FFR may also be coupled with hopping.

The HeNB 310 may use a High Interference Indicator (HII) to reserve the particular frequency resources. The HII may identify frequency resources that are sensitive to high interference levels. For example, the HeNB 310 may reserve the load information by sending the load information to the one or more interfering eNBs 302. Alternatively, the load information may be sent to potentially interfering eNBs. In one configuration, a macro-eNB 302 may use HII to reserve part of the bandwidth for macro-UEs. The macro-eNB 302 may send the reserved bandwidth information to CSG cells within the coverage range of the macro-eNB 302. HII is based on operators policy. In HII, a common bandwidth is used for all CSG cells. It may be impractical for the macro-eNB 302 to reserve resources, due to the potentially large number of HeNBs within a single macro-cell. Interference management may be simpler if all the control channels on a CSG cell are mapped to the Physical Uplink Shared Channel (PUSCH) and protected with ICIC.

Each macro-UE may know which CSG-cells it interferes with. However, as the number of CSG-cells increases within a wireless communication network, it may become much more likely that many macro-UEs interfere with at least one CSG-cell. An HeNB 310 may scan for all sounding reference signals (SRSs) and report any received signal to neighboring macro-cells.

In one configuration, the HeNB 310 may send 303 the load information to a relay node 306. The relay node 306 may then send 307 the load information to the one or more interfering eNBs 302. If an X2 interface 220 exists between the HeNB 310 and the one or more interfering eNBs 302, the load information may be sent directly to the interfering eNBs 302 through the X2 interface 220.

A data exchange 309 between the UE 304 and the HeNB 310 may then occur. The data exchange 309 may involve the UE 304 sending uplink transmissions 116b to the HeNB 310 using the reserved resources. The HeNB 310 may then send 311 an RRC_Connection release to the UE 304. An RRC_Connection release may release the UE 304 from the data exchange 309 with the HeNB 310 using the reserved resources. After the HeNB 310 has sent 311 an RRC_Connection release to the UE 304, the HeNB 310 may send load information to the interfering eNBs 302 releasing the reserved resources. In one configuration, the HeNB 310 may send 313 the load information to a relay node 306 and the relay node 306 may send 315 the load information to the interfering eNBs 302.

The HeNB 310 may also send the load information releasing the reserved resources to the interfering eNBs 302 when the UE 304 has been inactive for a sufficient period of time. For example, the HeNB 310 may send the load information releasing the reserved resources if the HeNB 310 has not received an uplink transmission 116b from the UE 304 for a certain amount of time. As another example, the HeNB 310 may send the load information releasing the reserved resources if the UE 304 has indicated a switch from RRC_Connected mode to RRC_Idle mode.

Figure 4:
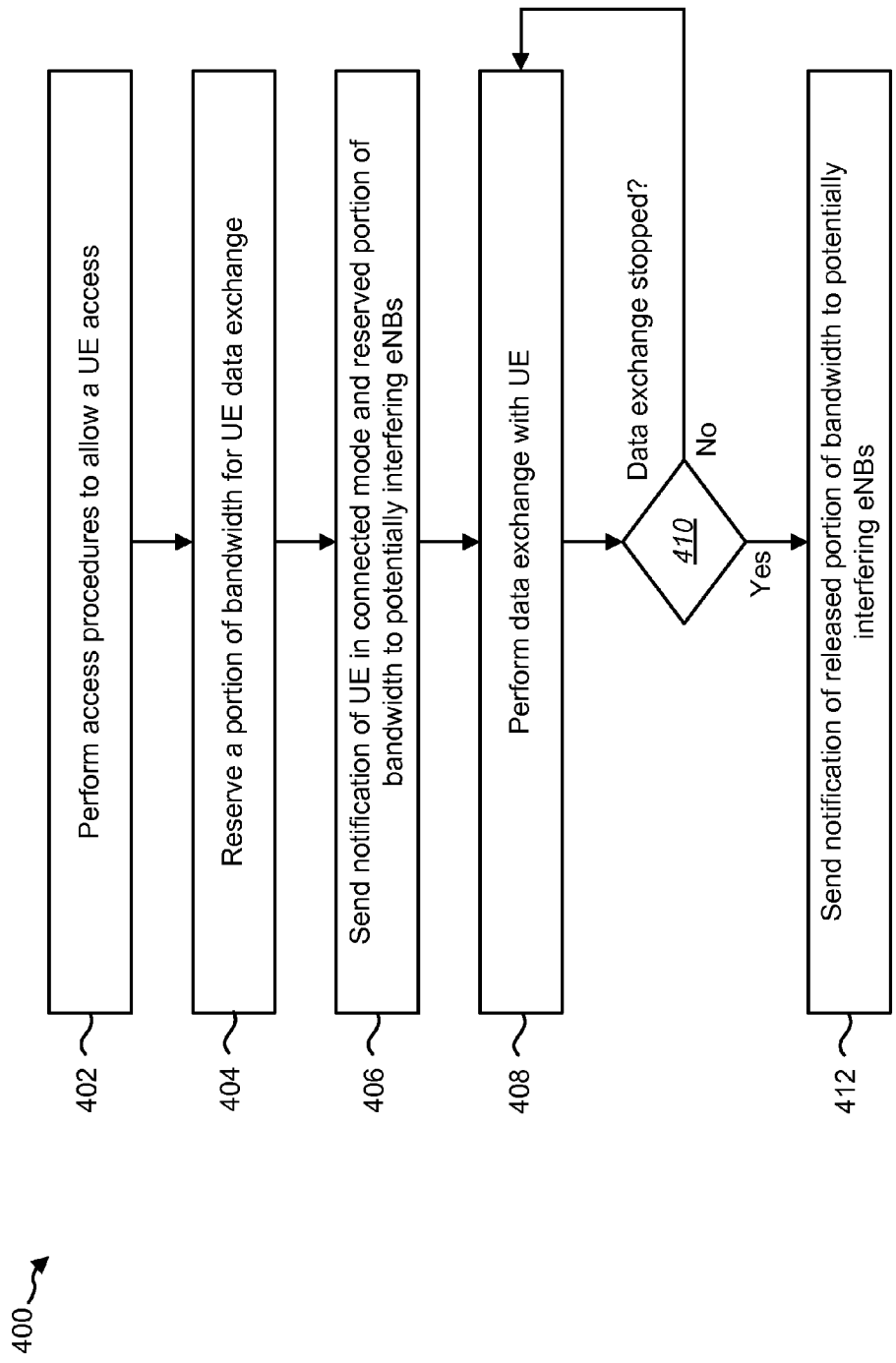
FIG. 4 is a flow diagram illustrating a method of uplink ICIC by an HeNB.

FIG. 4 is a flow diagram illustrating a method 400 of uplink ICIC by an HeNB 110. The HeNB 110 may perform 402 access procedures to allow a UE 104b access. The HeNB 110 may then reserve 404 a portion of the available bandwidth for UE 104b data exchange. Specifically, the HeNB 110 may reserve 404 a portion of the available bandwidth for the UE 104b to use for uplink data transmissions 116b.

The HeNB 110 may send 406 a notification of the UE 104b in connected mode and the reserved portion of the bandwidth to potentially interfering eNBs. The potentially interfering eNBs may include HeNBs and/or macro-eNBs. The HeNB 110 may then perform 408 a data exchange with the UE 104b. When the data exchange has stopped 410, the HeNB 110 may send 412 a notification of the released portion of bandwidth to the potentially interfering eNBs.

Figure 4A:
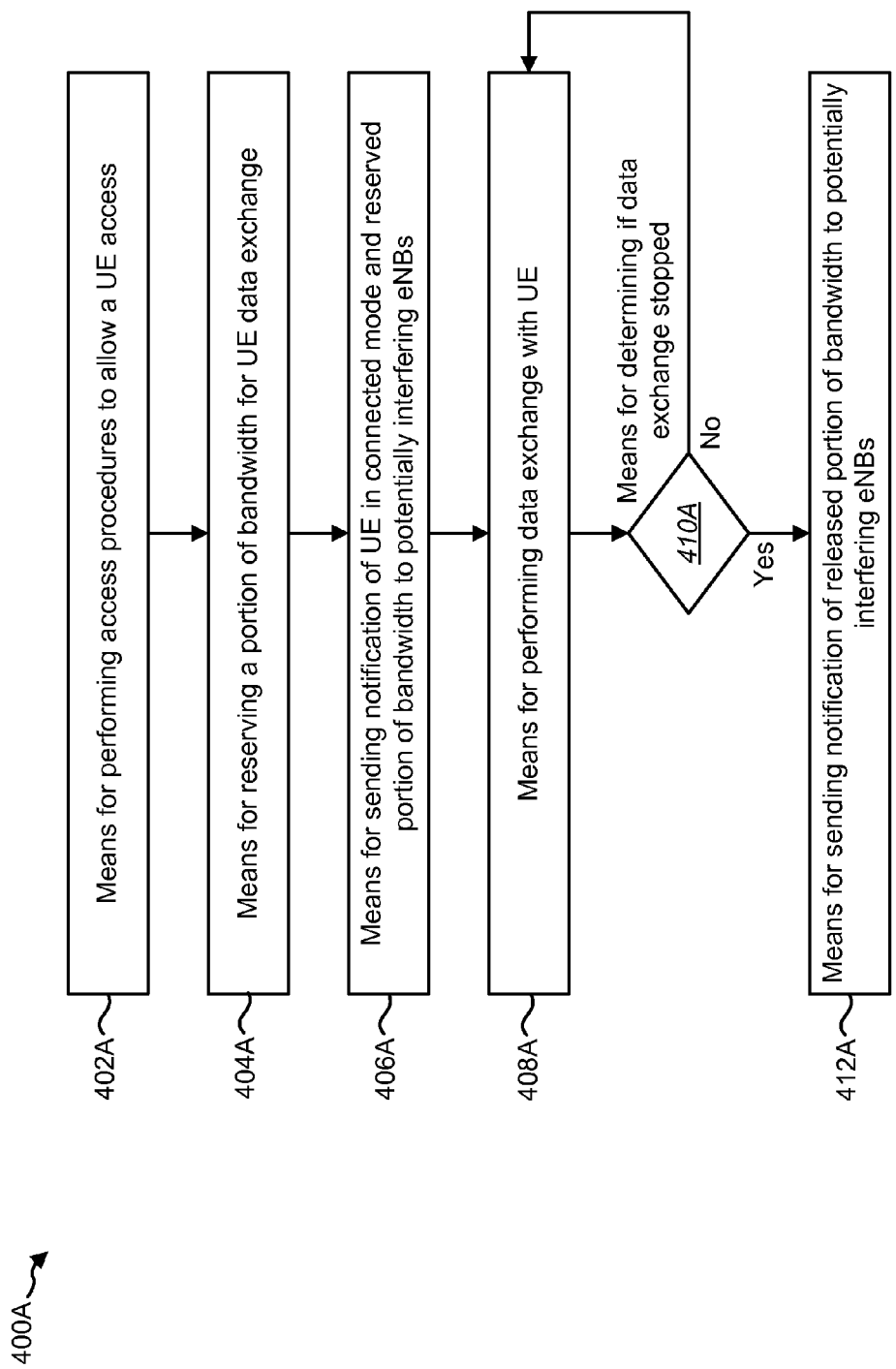
FIG. 4A illustrates means-plus-function blocks corresponding to the method of FIG. 4.

The method 400 of FIG. 4 described above may be performed by various hardware and/or software component(s) and/or module(s) corresponding to the means-plus-function blocks 400A illustrated in FIG. 4A. In other words, blocks 402 through 412 illustrated in FIG. 4 correspond to means-plus-function blocks 402A through 412A illustrated in FIG. 4A.

FIG. 5 illustrates transmission schemes 500 between a UE 504, a mobility management entity (MME) 542 and two or more eNBs for downlink ICIC. The UE 504 may be a macro-UE. For example, the UE 504 may be communicating with a macro-cell 112. One of the eNBs may be an HeNB 510. The HeNB 510 may be a restricted HeNB. For example, the HeNB 510 may only allow data exchange with UEs 504 that are part of the CSG of the HeNB 510. The UE 504 may communicate with an eNB 502. The UE 504 may not be part of the CSG of the HeNB 510. The UE 504 may perform 501a reselection to the restricted HeNB 510 even though the restricted HeNB 510 may not allow data exchange for the UE 504. For example, if the link between the UE 504 and the macro-cell 112 fails, the UE 504 may access an interfering HeNB 510 even if the HeNB 510 is restricted, so that the UE 504 may send measurement reports. Alternatively, in order to prevent failure, the macro-eNB 502 may request gaps to power control CSG-cells if the reference signal received power (RSRP) corresponding to the HeNBs 510 for these cells exceeds a maximum threshold. A gap may be a period of time where the UE 504 is not required to monitor the serving cell.

The UE 504 and HeNB 510 may perform 503 access procedures. The UE 504 may then register 505 with the CSG-cell by registering with the MME 542. The UE 504 may then have a new tracking area. Mobility based cell reselection parameters may scale as the UE 504 moves through dense CSG cell environments.

The MME 542 may page 507 the UE 504. For UE 504 terminated calls, the UE 504 may be paged 507 on the last register CSG-cell and the macro network tracking area. When the UE 504 is in the RRC_Idle state, the UE 504 may register with the MME 542 so that in the case of a UE 504 terminated call, the network (MME 542) may locate the UE 504 and send a page. A UE 504 may perform one registration per tracking area. The UE 504 may be able to register with a CSG cell (the CSG cell also makes up a tracking area) even though that CSG cell may not serve data traffic to the UE 504. After the UE 504 registers with the CSG cell, it 504 may be paged on a CSG cell, and after the UE 504 receives this page, the UE 504 may access the CSG cell and power it down so that the UE 504 may communicate with the macro network. If the UE 504 is not allowed to access the CSG cell, it may not be able to power it down and hence a macro UE would be in outage.

The UE 504 and HeNB 510 may again perform 509 access procedures. The UE 504 may then send 511a measurement report to the HeNB 510. Upon receiving the measurement report, the HeNB 510 may adjust 513 the transmit power according to the measurement report. For example, the HeNB 510 may reduce the HeNB 510 transmit power for a time period.

The UE 504 and an HeNB or macro-eNB 502 may then perform 515 access procedures. For both UE 504 originated calls and UE 504 terminated calls, the UE 504 may access the macro-eNB 502 when radio conditions are sufficient for doing so. For example, the interfering HeNB 510 may adjust 513 the transmit power such that the radio conditions are sufficient for the UE 504 to access the macro-cell 112. Upon completion of the access procedures, a data exchange 517 between the UE 504 and the HeNB or macro-eNB 502 may occur.

In case of partial co-channel deployment, rules may be needed for how the UE 504 takes into account measurements on the reference signal (RS) in resource blocks (RBs) where the HeNB 510 is transmitting. For example, if the UE 504 detects an HeNB cell 114 partially overlapping a macro-cell 112, measurement gaps may be required. For overlapping RBs, the UE 504 may discount (i.e. assume there is no signal) RS measurements. The UE 504 may effectively report lower channel quality indicators (CQIs) in order to ensure that the eNB 102 properly controls the power of the Packet Data Control Channel (PDCCH). The UE 504 may be able to receive the CQI in case an HeNB 510 is causing interference on those RBs.

Figure 6:
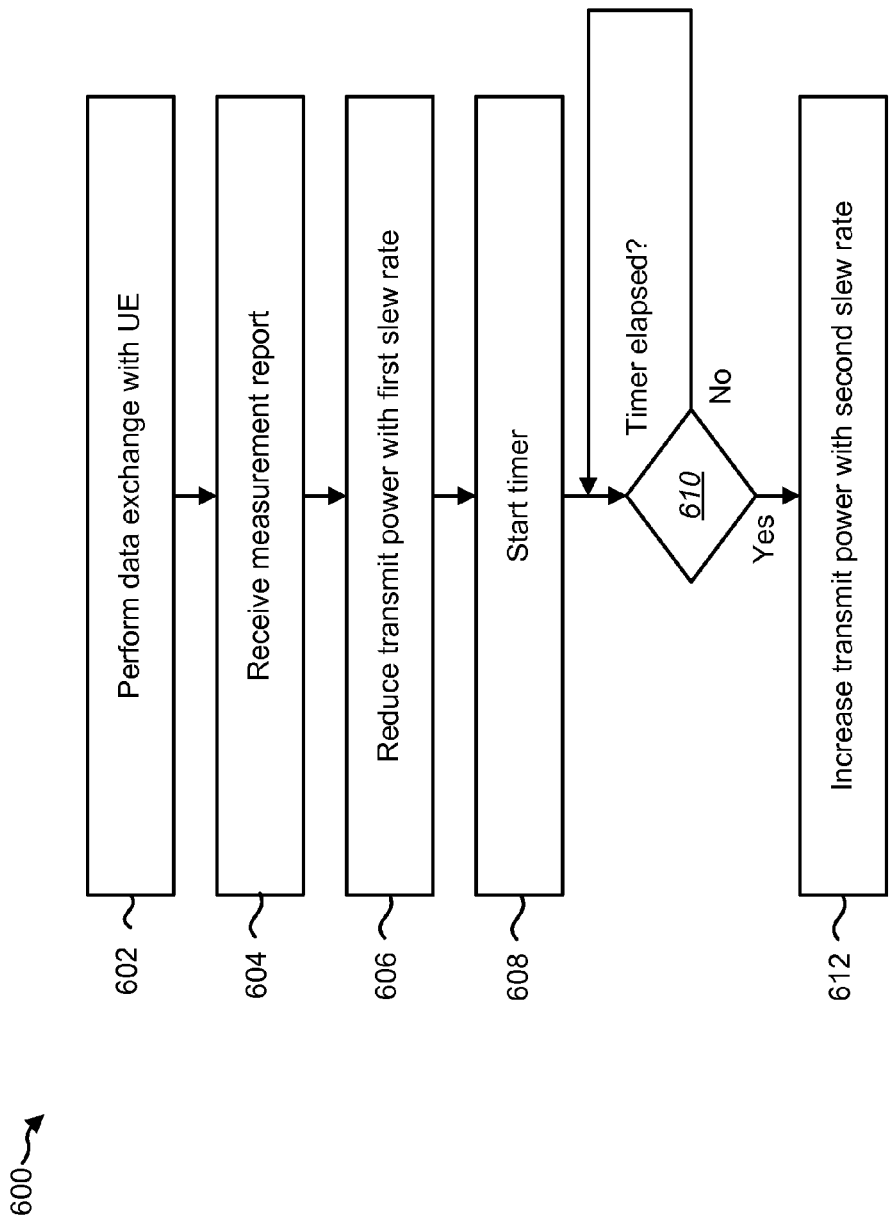
FIG. 6 is a flow diagram illustrating a method for downlink ICIC by an HeNB.

FIG. 6 is a flow diagram illustrating a method 600 for downlink ICIC by an HeNB 110. The HeNB 110 may perform 602 a data exchange with a UE 104*b*. The HeNB 110 may then receive 604 a measurement report. The HeNB 110 may receive 604 the measurement report from the UE 104*b*. Alternatively, the HeNB 110 may receive 604 the measurement report from another UE 104. Alternatively still, the HeNB 110 may receive 604 the measurement report from a macro-eNB 102 or another HeNB. The HeNB 110 may receive 604 the measurement report from a macro-eNB 102 via backhaul signaling.

The HeNB 110 may reduce 606 the transmit power with a first slew rate. The HeNB 110 may be required to reduce 606 the transmit power such that the reference signal received power (RSRP) received from the HeNB 110 by the UE 104*b* is below a maximum threshold if the macro-cell 112 RSRP is below a minimum threshold and the macro-cell reference signal received quality (RSRQ) is below a minimum threshold. The HeNB 110 may reduce 606 the transmit power to meet the maximum RSRP threshold using a first slew rate. The first slew rate may be in decibels (dB)/millisecond (ms). For example, the first slew rate may be 1 dB/ms. Generally, the power may be reduced until the macro UE can have good channel.

The HeNB 110 may then start 608 a timer. When the timer elapses 610, the HeNB 110 may increase 612 the transmit power with a second slew rate. The second slew rate may also be in dB/ms. The HeNB 110 may be provisioned to not transmit more power than the maximum RSRQ after accounting for minimum coupling loss. This may require a receiver functionally at the HeNB 110. In order to estimate the received quality in the vicinity of the HeNB 110, the HeNB 110 may estimate the received signal (from other cells that make up interference for the home UE) and compute the RSRQ after it accounts for its transmit power and minimum coupling loss.

Figure 6A:
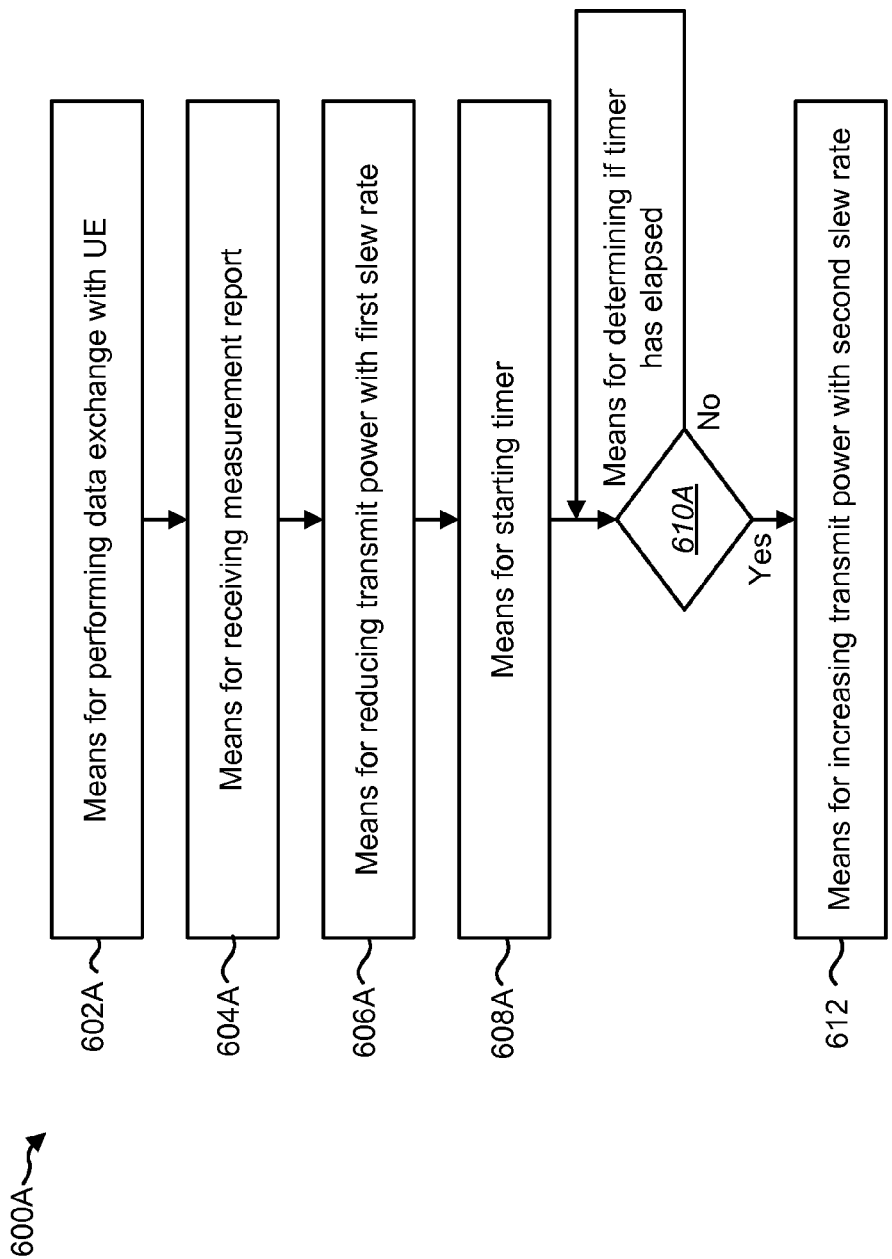
FIG. 6A illustrates means-plus-function blocks corresponding to the method of FIG. 6.

The method 600 of FIG. 6 described above may be performed by various hardware and/or software component(s) and/or module(s) corresponding to the means-plus-function blocks 600A illustrated in FIG. 6A. In other words, blocks 602 through 612 illustrated in FIG. 6 correspond to means-plus-function blocks 602A through 612A illustrated in FIG. 6A.

FIG. 7 is a flow diagram illustrating a method 700 for downlink ICIC by a UE 104*b*. The UE 104*b* may perform 702 data exchange with an eNB. In one configuration, the eNB may be a macro-eNB 102. Alternatively, the eNB may be an HeNB 110. The UE 104*b* may then measure 704 the received signal strength from an HeNB 110. The UE 104*b* may measure 704 the received signal strength using a physical layer procedure. The UE 104*b* may detect the synchronization signal from the eNB, and then it may perform a signal strength measurement. The UE 104*b* may prepare the received signal strength into a measurement report. The UE 104*b* may then send 706 the measurement report to an eNB. The eNB may be the eNB that the UE 104*b* performed data exchange with. Alternatively, the eNB may be a different eNB. In one configuration, the UE 104*b* may send 706 the measurement report to an HeNB 110.

The method 700 of FIG. 7 described above may be performed by various hardware and/or software component(s) and/or module(s) corresponding to the means-plus-function blocks 700A illustrated in FIG. 7A. In other words, blocks 702 through 706 illustrated in FIG. 7 correspond to means-plus-function blocks 702A through 706A illustrated in FIG. 7A.

FIG. 8 is a flow diagram illustrating another method 800 for downlink ICIC by a UE 104*b*. The UE 104*b* may perform 802 a reselection to a restricted HeNB 110 from an unrestricted eNB 102. A UE 104*b* may be allowed to access a restricted HeNB 110 if the macro-cell 112 is not suitable and there are no other frequencies available. A UE 104*b* may also be allowed to access a restricted HeNB 110 if the connection with a macro-cell 112 fails and there are no other frequencies available. The UE 104*b* may then register 804 with an MME 242. The UE 104*b* may receive 806 a page from the MME 242.

The UE 104*b* may then measure 808 the received signal strength of the restricted HeNB 110. The UE 104*b* may also measure 810 the received signal strength of other eNBs 102 that the UE 104*b* can detect. The UE 104*b* may prepare a measurement report that includes the received signal strength of the restricted HeNB 110. The measurement report may also include the received signal strengths of any other eNBs 102 that the UE 104*b* could detect.

The UE 104*b* may again access 812 the restricted HeNB 110. The UE 104*b* may then send 814 the measurement report to the restricted HeNB 110. The UE 104*b* may next access 816 the unrestricted eNB 102. The UE 104*b* may access 816 the unrestricted eNB 102 when radio conditions are sufficient. The UE 104*b* may then perform 818 a data exchange with the unrestricted eNB 102.

Figure 8A:
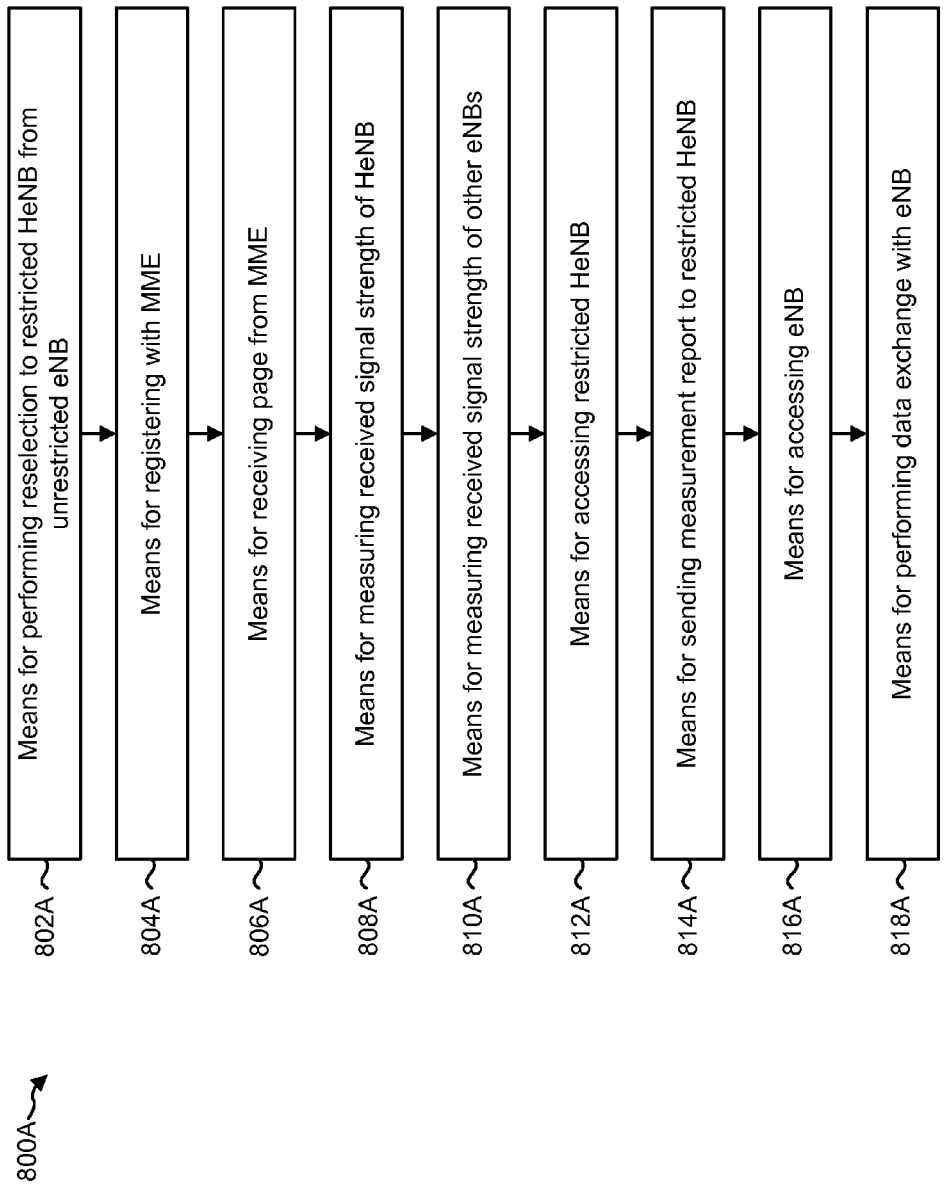
FIG. 8A illustrates means-plus-function blocks corresponding to the method of FIG. 8.

The method 800 of FIG. 8 described above may be performed by various hardware and/or software component(s) and/or module(s) corresponding to the means-plus-function blocks 800A illustrated in FIG. 8A. In other words, blocks 802 through 818 illustrated in FIG. 8 correspond to means-plus-function blocks 802A through 818A illustrated in FIG. 8A.

Figure 9:
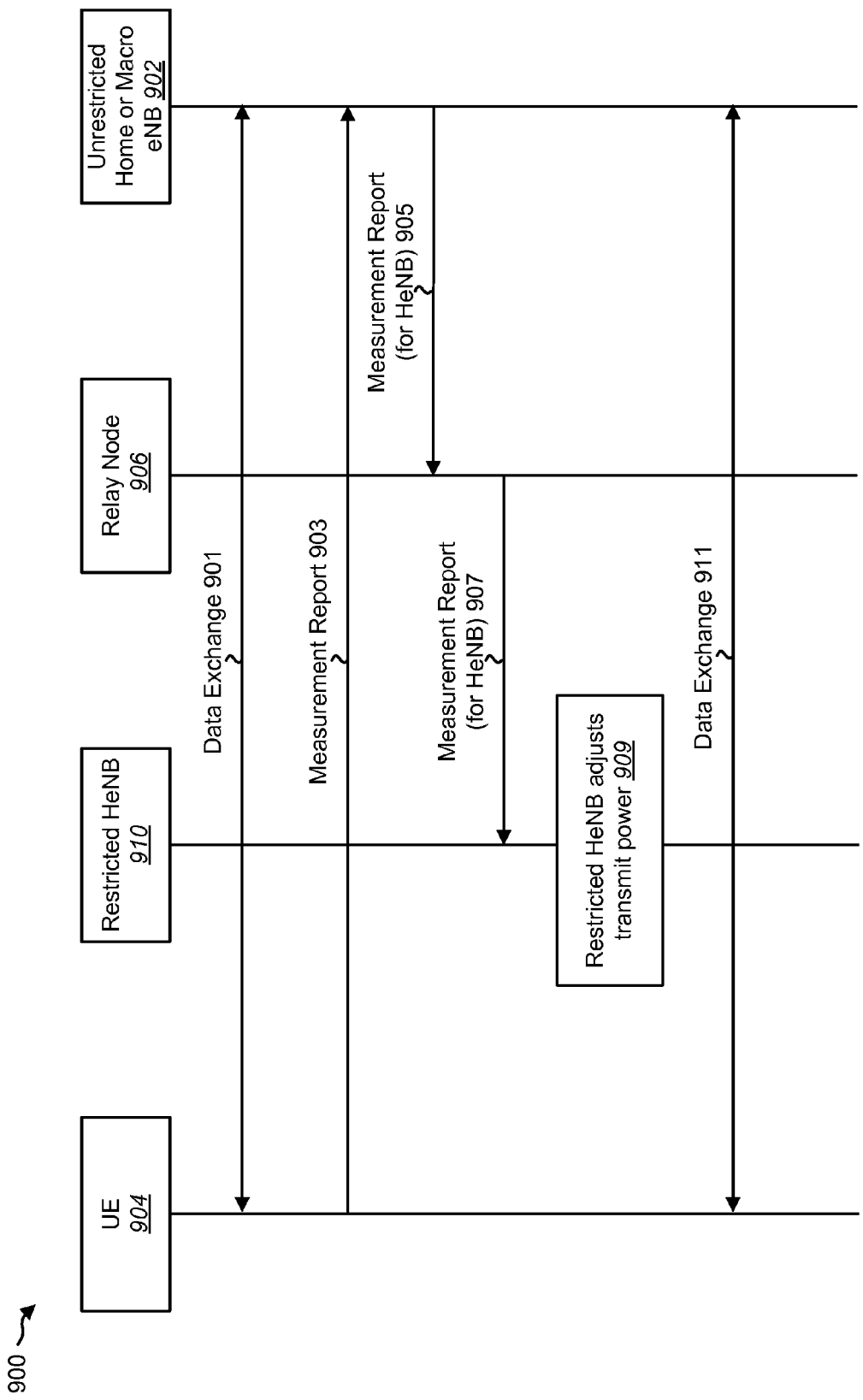
FIG. 9 illustrates transmission schemes between a UE, a restricted HeNB and one or more unrestricted eNBs for downlink ICIC.

FIG. 9 illustrates transmission schemes 900 between a UE 904, a restricted HeNB 910 and one or more unrestricted eNBs 902 for downlink ICIC. A data exchange 901 may occur between the UE 904 and an unrestricted eNB 902. The UE 904 may then send 903 a measurement report corresponding to the HeNB 910 to the unrestricted eNB 902. The unrestricted eNB 902 may send 905 the measurement report corresponding to the HeNB 910 to a relay node 906. The relay node 906 may then send 907 the measurement report corresponding to the restricted HeNB 910 to the restricted HeNB 910.

Upon receiving the measurement report, the restricted HeNB 910 may adjust 909 the transmit power. For example, the restricted HeNB 910 may reduce the transmit power by a reduction slew rate. The HeNB 910 may be required to adjust 909 the transmit power according to the received measurement report. For example, the HeNB 910 may be required to perform downlink power control. The downlink power control may be facilitated through backhaul signaling such as through an S1 236. A data exchange 911 may then occur between the UE 904 and the unrestricted eNB 902.

Figure 10:
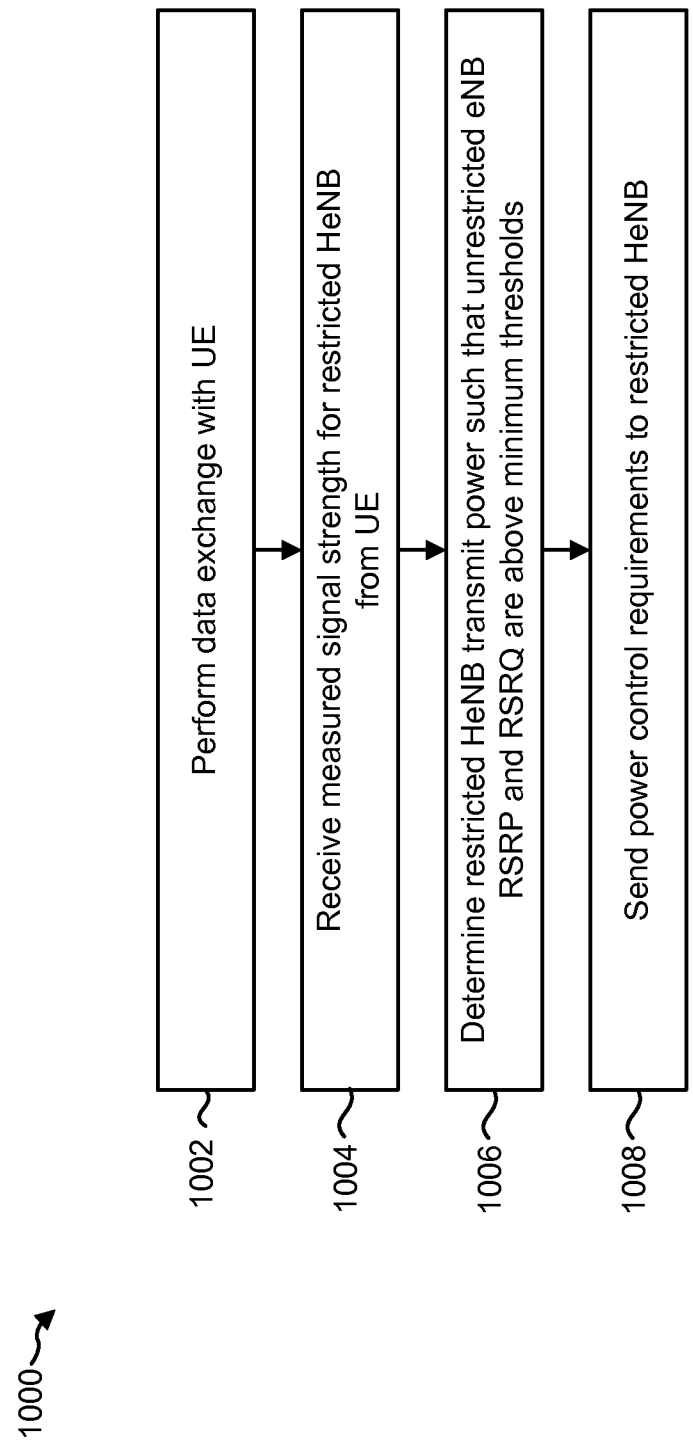
FIG. 10 is a flow diagram illustrating a method for downlink ICIC by an eNB.

FIG. 10 is a flow diagram illustrating a method 1000 for downlink ICIC by an eNB. The eNB may be a macro-eNB 102. Alternatively, the eNB may be an HeNB 110. The eNB may be an unrestricted eNB. The eNB may perform 1002 a data exchange with a UE 104. The eNB may receive 1004 the measured signal strength for a restricted HeNB 110 from the UE 104. The eNB may next determine 1006 the restricted HeNB 110 transmits power such that the eNB RSRP and RSRQ are above minimum thresholds. The eNB may then send 1008 the determined power control requirements to the restricted HeNB 110.

Figure 10A:
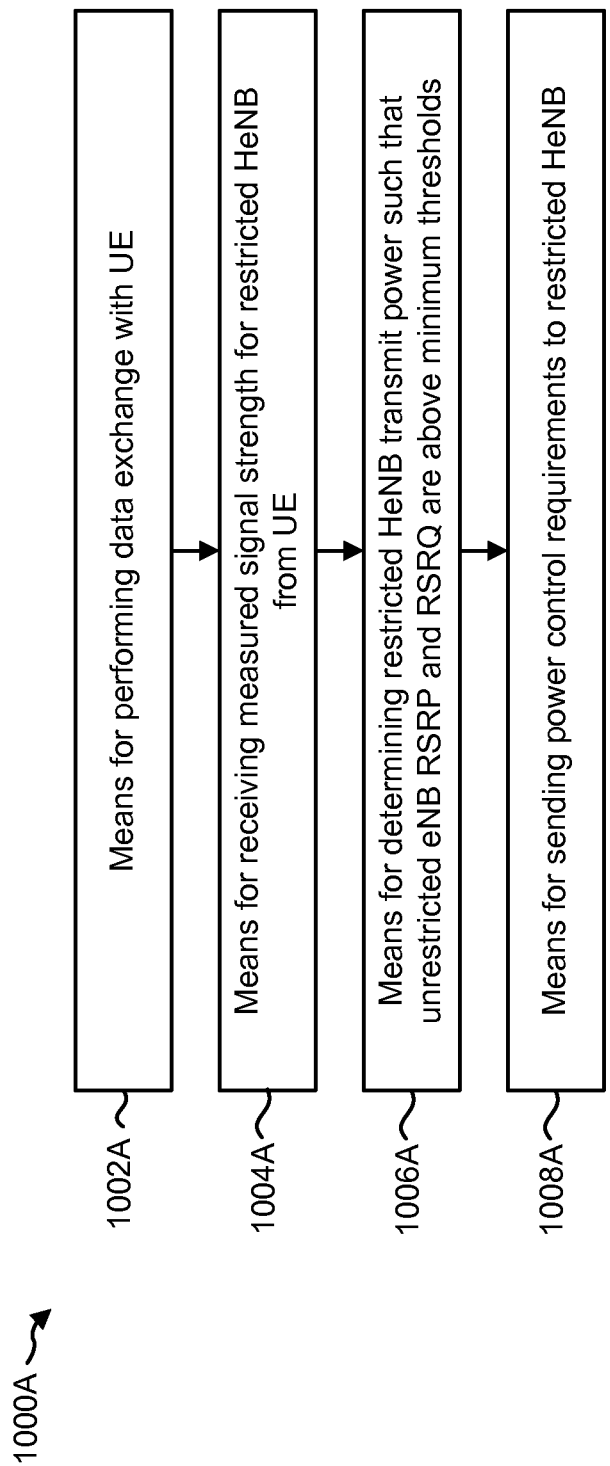
FIG. 10A illustrates means-plus-function blocks corresponding to the method of FIG. 10.

The method 1000 of FIG. 10 described above may be performed by various hardware and/or software component(s) and/or module(s) corresponding to the means-plus-function blocks 1000A illustrated in FIG. 10A. In other words, blocks 1002 through 1008 illustrated in FIG. 10 correspond to means-plus-function blocks 1002A through 1008A illustrated in FIG. 10A.

Figure 11:
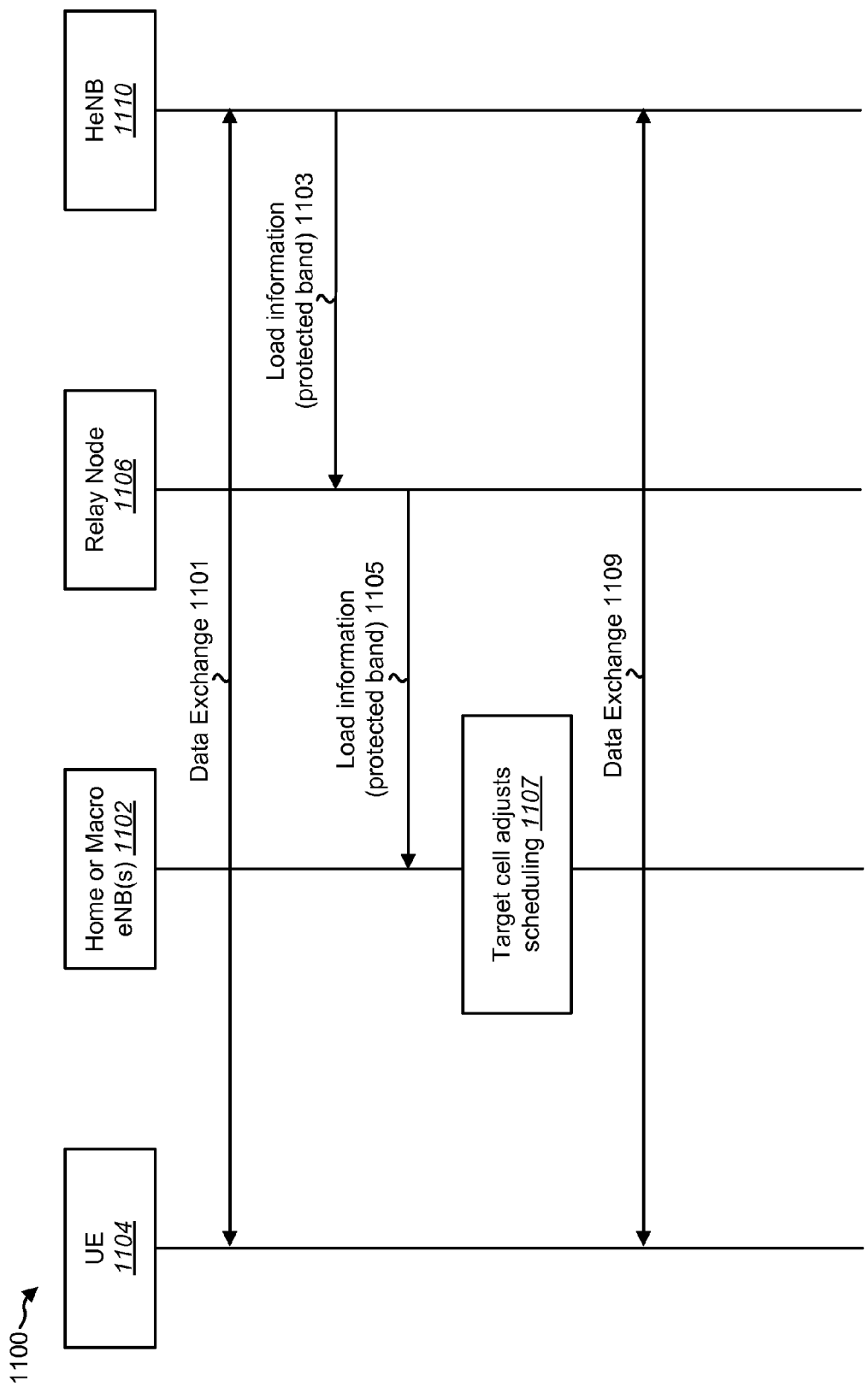
FIG. 11 illustrates transmission schemes between a UE, an HeNB and one or more unrestricted eNBs for downlink ICIC.

FIG. 11 illustrates transmission schemes 1100 between a UE 1104, an HeNB 1110 and one or more unrestricted eNBs 1102 for downlink ICIC. A data exchange 1101 may occur between the UE 1104 and the HeNB 1110. The HeNB 1110 may then reserve portions of the frequency band for downlink transmission between the HeNB 1110 and the UE 1104. The HeNB 1110 may then send 1103 load information such as the reserved portions of the frequency band to a relay node 1106. The load information may include protected subbands. The relay node 1106 may send 1105 the load information to the one or more unrestricted eNBs 1102. The one or more unrestricted eNBs 1102 may adjust 1107 scheduling according to the received load information. For example, the one or more unrestricted eNBs 1102 may adjust 1107 downlink scheduling to avoid inter-cell interference with the HeNB 1110. A data exchange 1109 may then occur between the UE 1104 and the HeNB 1110.

Figure 12:
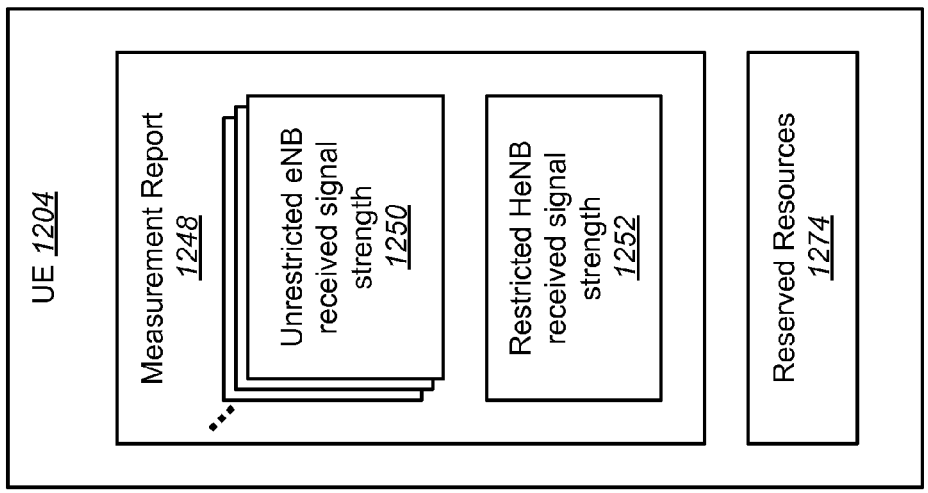
FIG. 12 is a block diagram illustrating the various components of a UE for use in the present methods and apparatus.

FIG. 12 is a block diagram illustrating the various components of a UE 1204 for use in the present methods and apparatus. The UE 1204 may include a measurement report 1248. The measurement report 1248 may include a restricted HeNB received signal strength 1252. The measurement report 1248 may also include one or more unrestricted eNB received signal strengths 1250. The UE 1204 may prepare the measurement report 1248 to be sent to an HeNB 110 and/or an eNB 102. The UE 1204 may also include the reserved resources 1274 for communication with an HeNB 110.

Figure 13:
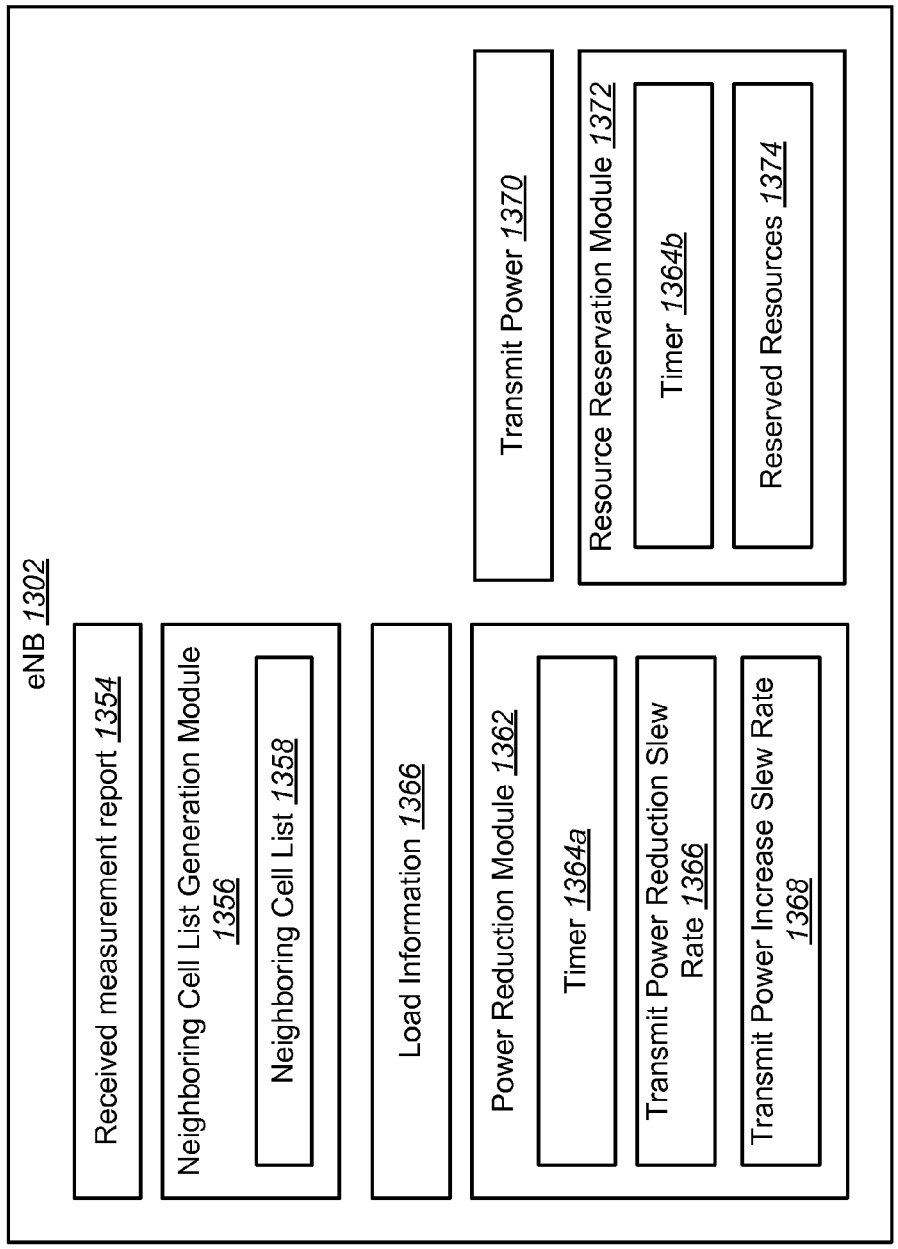
FIG. 13 is a block diagram illustrating the various components of an eNB for use in the present methods and apparatus.

FIG. 13 is a block diagram illustrating the various components of an eNB 1302 for use in the present methods and apparatus. The eNB 1302 may be a restricted HeNB 110, an unrestricted HeNB 110, or a macro-eNB 102. The eNB 1302 may include a received measurement report 1354. The eNB 1302 may receive the measurement report 1354 from a UE 104. The received measurement report 1354 may include power measurements and/or power control for the eNB 1302. Alternatively, the received measurement report 1354 may include power measurements and/or power control for an HeNB 110 which the eNB 1302 will forward the measurement report to.

The eNB 1302 may also include a neighboring cell list generation module 1356. The neighboring cell list generation module 1356 may generate a neighboring cell list 1358. The neighboring cell list 1358 may include a list of one or more interfering eNBs 102. As discussed above, an interfering eNB may be a nearby eNB whose communications with a UE 104 interfere with communications between the eNB 1302 and a UE 104. The neighboring cell list 1358 may also include a list of one or more potentially interfering eNBs 102.

The neighboring cell list generation module 1356 may generate the neighboring cell list 1358. The neighboring cell list generation module 1356 may generate the neighboring cell list 1358 based on CSG eNB measurements. CSG eNB measurements may be measurements by the HeNB of the received signal strength from eNBs. The neighboring cell list generation module 1356 may also generate the neighboring cell list 1358 based on UE 104 measurements. The UE 104 measurements may include SON functionality.

The eNB 1302 may also include load information 1366. The load information 1366 may include overload and/or protected bands for the eNB 1302 and/or a UE 104. For example, the load information 1366 may include reserved portions of the bandwidth for uplink and/or downlink communications with a UE 104. The eNB 1302 may include the transmit power 1370 for the eNB 1302. The transmit power 1370 may be the transmit power 1370 that the eNB 1302 uses when sending transmissions to a UE 104 over the downlink.

The eNB 1302 may include a power reduction module 1362. The power reduction module 1362 may determine when to reduce or increase the transmit power 1370. The power reduction module 1362 may also determine the rate and amount of change to the transmit power 1370. The power reduction module 1362 may include a timer 1364a. The power reduction module 1362 may use the timer 1364a to determine how long the transmit power 1370 should remain at a reduced level.

The power reduction module 1362 may also include a transmit power reduction slew rate 1366. The transmit power reduction slew rate 1366 may define the rate of reduction of the transmit power 1370 for the eNB 1302 when the transmit power 1370 of the eNB 1302 needs to be reduced. The transmit power reduction slew rate 1366 may be in dB/ms. The power reduction module 1362 may also include a transmit power increase slew rate 1368. The transmit power increase slew rate 1368 may define the rate at which the transmit power 1370 is increased after the timer 1364a has expired. The transmit power increase slew rate 1368 may also be in dB/ms.

The eNB 1302 may include a resource reservation module 1372. The resource reservation module 1372 may schedule resources for communications with a UE 104. For example, the resource reservation module 1372 may include a list of the reserved resources 1374 for communications with a UE 104. The resource reservation module 1372 may also include a timer 1364b. The resource reservation module 1372 may release reserved resources 1374 if the timer 1364b has elapsed before communications have been received from a UE 104.

Figure 14:
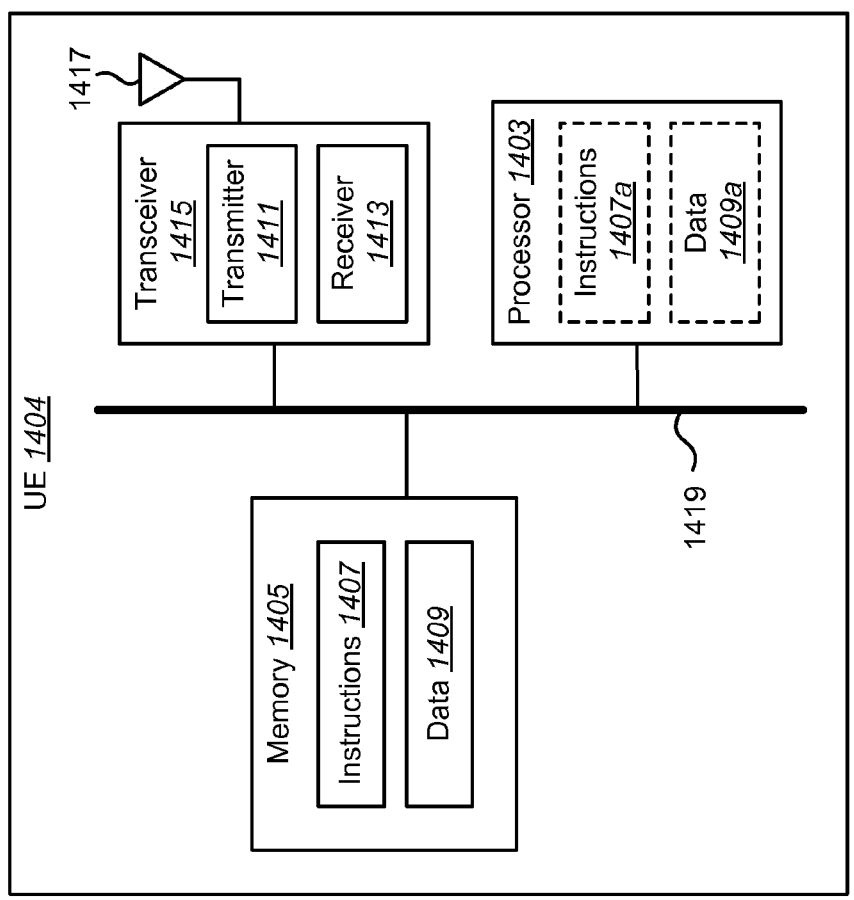
FIG. 14 illustrates certain components that may be included within a UE.

FIG. 14 illustrates certain components that may be included within a UE 1404. The UE 1404 may be a mobile device/station. Examples of mobile stations include cellular phones, handheld wireless devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

The UE 1404 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the UE 1404 of FIG. 14, in an alternative configuration, a combination of processors (e.g., an ARM and DSP) could be used.

The UE 1404 also includes memory 1405. The memory 1405 may be any electronic component capable of storing electronic information. The memory 1405 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1409 and instructions 1407 may be stored in the memory 1405. The instructions 1407 may be executable by the processor 1403 to implement the methods disclosed herein. Executing the instructions 1407 may involve the use of the data 1409 that is stored in the memory 1405. When the processor 1403 executes the instructions 1407, various portions of the instructions 1407*a* may be loaded onto the processor 1403, and various pieces of data 1409*a* may be loaded onto the processor 1403.

The UE 1404 may also include a transmitter 1411 and a receiver 1413 to allow transmission and reception of signals to and from the UE 1404. The transmitter 1411 and receiver 1413 may be collectively referred to as a transceiver 1415. An antenna 1417 may be electrically coupled to the transceiver 1415. The UE 1404 may also include (not shown) multiple transmitters, multiple receivers, multiple transceivers and/or multiple antennas.

The various components of the UE 1404 may be coupled together by one or more buses, which may include a power bus, a control signal bus, a status signal bus, a data bus, etc. For the sake of clarity, the various buses are illustrated in FIG. 14 as a bus system 1419.

Figure 15:
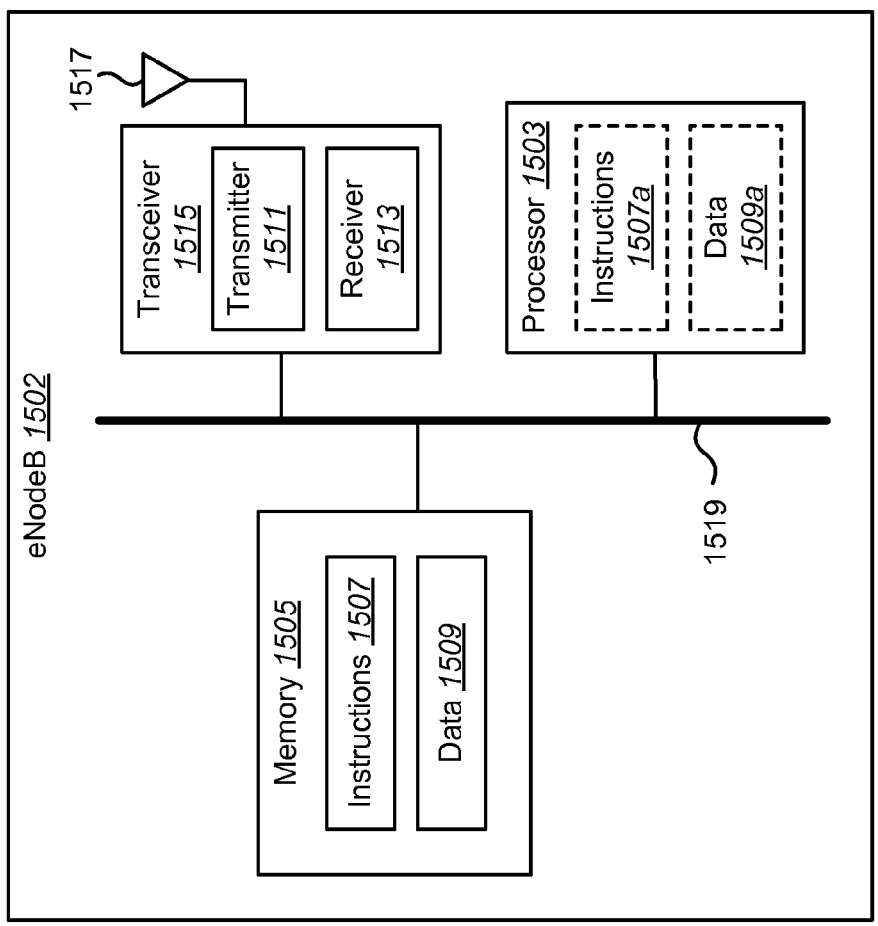
FIG. 15 illustrates certain components that may be included within an eNB.

FIG. 15 illustrates certain components that may be included within an eNB 1502. An eNB 1502 may be a base station. For example, the eNB may be the central base station in a 3GPP LTE wireless communication system. As another example, the eNB 1502 may be an HeNB 110 for use in a 3GPP LTE wireless communication system.

The eNB 1502 includes a processor 1503. The processor 1503 may be a general purpose single- or multi-chip microprocessor (e.g., an ARM), a special purpose microprocessor (e.g., a digital signal processor (DSP)), a microcontroller, a programmable gate array, etc. The processor 1503 may be referred to as a central processing unit (CPU). Although just a single processor 1503 is shown in the eNB 1502 of FIG. 15, in an alternative configuration, a combination of processors (e.g., an ARM and DSP) could be used.

The eNB 1502 also includes memory 1505. The memory 1505 may be any electronic component capable of storing electronic information. The memory 1505 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1509 and instructions 1507 may be stored in the memory 1505. The instructions 1507 may be executable by the processor 1503 to implement the methods disclosed herein. Executing the instructions 1507 may involve the use of the data 1509 that is stored in the memory 1505. When the processor 1503 executes the instructions 1507, various portions of the instructions 1507*a* may be loaded onto the processor 1503, and various pieces of data 1509*a* may be loaded onto the processor 1503.

The eNB 1502 may also include a transmitter 1511 and a receiver 1513 to allow transmission and reception of signals to and from the eNB 1502. The transmitter 1511 and receiver 1513 may be collectively referred to as a transceiver 1515. An antenna 1517 may be electrically coupled to the transceiver 1515. The eNB 1502 may also include (not shown) multiple transmitters, multiple receivers, multiple transceivers and/or multiple antennas.

The various components of the eNB 1502 may be coupled together by one or more buses, which may include a power bus, a control signal bus, a status signal bus, a data bus, etc. For the sake of clarity, the various buses are illustrated in FIG. 15 as a bus system 1519.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 4, 6, 7, 8 and 10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method operable by a semi-autonomous base station, comprising:
reserving a portion of bandwidth for a user equipment;
sending notification of the reserved portion of bandwidth to at least one potentially interfering base station;
performing a data exchange with the user equipment using the reserved portion of bandwidth; and
sending notification to the at least one potentially interfering base station releasing the reserved portion of bandwidth.

2. The method of claim 1, wherein the notification releasing the reserved portion of bandwidth is sent when the data exchange with the user equipment has stopped.

3. The method of claim 1, wherein the notification releasing the reserved portion of bandwidth is sent when the user equipment enters idle mode.

4. The method of claim 1, wherein the at least one potentially interfering base station is identified through a self organizing network server.

5. The method of claim 1, wherein the semi-autonomous base station communicates with the at least one potentially interfering base station through a backhaul connection.

6. The method of claim 1, wherein the semi-autonomous base station communicates with the at least one potentially interfering base station through an X2 link.

7. The method of claim 1, wherein the at least one potentially interfering base station comprises another H semi-autonomous base station.

8. A method operable by a user equipment, comprising:
measuring a received signal strength for a semi-autonomous base station;
preparing a measurement report, wherein the measurement report includes the received signal strength for the semi-autonomous base station; and
sending the measurement report to a first base station.

9. The method of claim 8, wherein the semi-autonomous base station is a restricted semi-autonomous base station, and wherein the user equipment does not belong to a closed subscriber group for the semi-autonomous base station.

10. The method of claim 9, wherein the first base station is the semi-autonomous base station, and further comprising:
performing a reselection to the semi-autonomous base station;
performing access procedures with the semi-autonomous base station for a first time;
registering with a mobility management entity;
receiving a page from the mobility management entity; and
performing access procedures with the semi-autonomous base station for a second time, wherein the user equipment performs access procedures with the semi-autonomous base station for the second time before sending the measurement report to the semi-autonomous base station.

11. The method of claim 10, wherein performing a reselection to the semi-autonomous base station occurs because downlink signals from the semi-autonomous base station are interfering with downlink signals from a second base station.

12. The method of claim 11, further comprising performing access procedures with the second base station.

13. A semi-autonomous base station comprising:
a processor;
memory in electronic communication with the processor;
instructions stored in the memory, the instructions being executable by the processor to:
reserve a portion of bandwidth for a user equipment;
send notification of the reserved portion of bandwidth to at least one potentially interfering base station;
perform a data exchange with the user equipment using the reserved portion of bandwidth; and
send notification to the potentially interfering base stations releasing the reserved portion of bandwidth.

14. The semi-autonomous base station of claim 13, wherein the notification releasing the reserved portion of bandwidth is sent when the data exchange with the user equipment has stopped.

15. The semi-autonomous base station of claim 13, wherein the notification releasing the reserved portion of bandwidth is sent when the user equipment enters idle mode.

16. The semi-autonomous base station of claim 13, wherein the at least one potentially interfering base station is identified through a self organizing network (SON) server.

17. The semi-autonomous base station of claim 13, wherein the semi-autonomous base station communicates with the at least one potentially interfering base station through a backhaul connection.

18. The semi-autonomous base station of claim 13, wherein the semi-autonomous base station communicates with the at least one potentially interfering base station through an X2 link.

19. The semi-autonomous base station of claim 13, wherein the at least one potentially interfering base station comprises another semi-autonomous base station.

20. A user equipment comprising:
a processor;
memory in electronic communication with the processor;
instructions stored in the memory, the instructions being executable by the processor to:
measure a received signal strength for a semi-autonomous base station;
prepare a measurement report, wherein the measurement report includes the received signal strength for the semi-autonomous base station; and
send the measurement report to a first base station.

21. The user equipment of claim 20, wherein the semi-autonomous base station is a restricted semi-autonomous base station, and wherein the user equipment does not belong to a closed subscriber group for the semi-autonomous base station.

22. The user equipment of claim 21, wherein the first base station is the semi-autonomous base station, and wherein the instructions are further executable to:
perform a reselection to the semi-autonomous base station;
perform access procedures with the semi-autonomous base station for a first time;
register with a mobility management entity;
receive a page from the mobility management entity; and
perform access procedures with the semi-autonomous base station for a second time, wherein the user equipment performs access procedures with the semi-autonomous base station for the second time before sending the measurement report to the semi-autonomous base station.

23. The user equipment of claim 22, wherein performing a reselection to the semi-autonomous base station occurs because downlink signals from the semi-autonomous base station are interfering with downlink signals from a second base station.

24. The user equipment of claim 23, wherein the instructions are further executable to perform access procedures with the second base station.

25. An apparatus comprising:
means for reserving a portion of bandwidth for a user equipment;
means for sending notification of the reserved portion of bandwidth to at least one potentially interfering base station;
means for performing a data exchange with the user equipment using the reserved portion of bandwidth; and
means for sending notification to the at least one potentially interfering base station releasing the reserved portion of bandwidth.

26. The apparatus of claim 25, wherein the notification releasing the reserved portion of bandwidth is sent when the data exchange with the base station has stopped.

27. The apparatus of claim 25, wherein the at least one potentially interfering base station is identified through a self organizing network server.

28. An apparatus, comprising:
means for measuring a received signal strength for a semi-autonomous base station;
means for preparing a measurement report, wherein the measurement report includes the received signal strength for the semi-autonomous base station; and
means for sending the measurement report to a first base station.

29. The apparatus of claim 28, wherein the first base station is the semi-autonomous base station, and further comprising:
means for performing a reselection to the semi-autonomous base station;
means for performing access procedures with the semi-autonomous base station for a first time;
means for registering with a mobility management entity;
means for receiving a page from the mobility management entity; and
means for performing access procedures with the semi-autonomous base station for a second time, wherein the user equipment performs access procedures with the semi-autonomous base station for the second time before sending the measurement report to the semi-autonomous base station.

* * * * *